United States Patent [19]

Martin et al.

[11] Patent Number: 6,067,077
[45] Date of Patent: May 23, 2000

[54] POSITION SENSING FOR FORCE FEEDBACK DEVICES

[75] Inventors: Kenneth M. Martin, Palo Alto; Adam C. Braun; Ryan D. Bruneau, both of Sunnyvale, all of Calif.

[73] Assignee: Immersion Corporation, San Jose, Calif.

[21] Appl. No.: 09/138,309

[22] Filed: Aug. 21, 1998

Related U.S. Application Data

[63] Continuation-in-part of application No. 09/058,259, Apr. 10, 1998.
[51] Int. Cl.$^7$ .................................................. G06F 3/033
[52] U.S. Cl. ............................................ 345/161; 463/38
[58] Field of Search ..................................... 345/156–157, 345/161–163, 158, 159, 184; 318/568.1; 463/38, 30, 36, 37

[56] References Cited

U.S. PATENT DOCUMENTS

| | | | |
|---|---|---|---|
| 3,490,059 | 1/1970 | Paulsen et al. | 73/133 |
| 3,903,614 | 9/1975 | Diamond et al. | 35/12 S |
| 3,919,691 | 11/1975 | Noll | 340/172.5 |
| 4,148,014 | 4/1979 | Burson | 340/709 |
| 4,227,319 | 10/1980 | Guy et al. | 35/12 S |
| 4,398,889 | 8/1983 | Lam et al. | 434/45 |

(List continued on next page.)

FOREIGN PATENT DOCUMENTS

| | | |
|---|---|---|
| 0 085 518 | 8/1983 | European Pat. Off. . |
| 0 111 992 | 6/1984 | European Pat. Off. . |
| 0470257A1 | 2/1992 | European Pat. Off. . |
| 0626634A2 | 11/1994 | European Pat. Off. . |
| 0655301A1 | 5/1995 | European Pat. Off. . |
| 0875819 | 11/1998 | European Pat. Off. . |
| WO9520788 | 8/1995 | WIPO . |
| WO9532459 | 11/1995 | WIPO . |

OTHER PUBLICATIONS

Frederick P. Brooks, Jr. et al., "Project GROPE–Haptic Displays for Scientific Visualization," Computer Graphics, vol. 24 #4, Aug. 1990, pp. 177–185.

(List continued on next page.)

*Primary Examiner*—Matthew Luu
*Assistant Examiner*—Jeff Piziali
*Attorney, Agent, or Firm*—James R. Riegel

[57] ABSTRACT

Improvements in accurately sensing a user manipulandum of a force feedback device. A force feedback device, coupled to a host computer, includes an actuator for outputting forces on a manipulandum and a sensor for detecting a position of the manipulandum. In one feature, a raw sensor value representing manipulandum position is adjusted based on compliance between sensor and manipulandum, where the adjustment can be based on a compliance constant and an output force. In another feature, a range of motion of the manipulandum is dynamically calibrated from startup. One boundary value of an assigned initial range is set equal to a received sensor value if the sensor value is outside the initial range, and the other boundary value is adjusted to maintain the size of the initial range unless the other boundary value has already been sensed outside the initial range. In another feature, manipulandum position is accurately sensed by filtering raw sensor values for overshoot values occurring at limits to manipulandum motion and using the filtered value in the dynamic calibration. In another feature, sensing inaccuracies caused by compliance in the device are decreased by normalizing a raw sensor value to a normalized range of motion that includes a saturation zone at each end of the range that adjusts sensor values over a saturation level to the saturation level.

44 Claims, 10 Drawing Sheets

U.S. PATENT DOCUMENTS

| | | | |
|---|---|---|---|
| 4,477,043 | 10/1984 | Repperger | 244/223 |
| 4,560,983 | 12/1985 | Williams | 340/825 |
| 4,603,284 | 7/1986 | Perzley | 318/568 |
| 4,632,341 | 12/1986 | Repperger et al. | 244/230 |
| 4,677,355 | 6/1987 | Baumann | 318/160 |
| 4,734,685 | 3/1988 | Watanabe | 340/710 |
| 4,775,289 | 10/1988 | Kazerooni | 414/735 |
| 4,795,296 | 1/1989 | Jau | 414/5 |
| 4,800,721 | 1/1989 | Cemenska et al. | 60/393 |
| 4,811,608 | 3/1989 | Hilton | 73/862.04 |
| 4,815,006 | 3/1989 | Andersson et al. | 395/89 |
| 4,819,195 | 4/1989 | Bell et al. | 364/571.05 |
| 4,823,634 | 4/1989 | Culver | 74/471 XY |
| 4,840,634 | 6/1989 | Muller et al. | 623/24 |
| 4,868,549 | 9/1989 | Affinito et al. | 340/710 |
| 4,914,976 | 4/1990 | Wyllie | 74/523 |
| 4,935,728 | 6/1990 | Kley | 340/709 |
| 4,961,038 | 10/1990 | MacMinn | 318/696 |
| 4,962,448 | 10/1990 | DeMaio et al. | 364/146 |
| 4,982,504 | 1/1991 | Soderberg et al. | 33/502 |
| 4,983,901 | 1/1991 | Lehmer | 318/685 |
| 5,007,300 | 4/1991 | Siva | 74/471 XY |
| 5,044,956 | 9/1991 | Behensky et al. | 434/45 |
| 5,076,517 | 12/1991 | Ferranti et al. | 244/228 |
| 5,103,404 | 4/1992 | McIntosh | 318/568.22 |
| 5,107,080 | 4/1992 | Rosen | 200/6 A |
| 5,116,051 | 5/1992 | Moncrief et al. | 273/448 B |
| 5,116,180 | 5/1992 | Fung et al. | 414/5 |
| 5,125,261 | 6/1992 | Powley | 73/1 J |
| 5,142,931 | 9/1992 | Menahem | 74/471 XY |
| 5,143,505 | 9/1992 | Burdea et al. | 414/5 |
| 5,146,566 | 9/1992 | Hollis, Jr. et al. | 395/275 |
| 5,148,377 | 9/1992 | McDonald | 364/560 |
| 5,156,363 | 10/1992 | Cizewski et al. | 244/223 |
| 5,182,557 | 1/1993 | Lang | 341/20 |
| 5,184,319 | 2/1993 | Kramer | 364/806 |
| 5,185,561 | 2/1993 | Good et al. | 318/432 |
| 5,193,963 | 3/1993 | McAffee et al. | 414/5 |
| 5,195,179 | 3/1993 | Tokunaga | 395/161 |
| 5,204,600 | 4/1993 | Kahkoska | 318/602 |
| 5,206,930 | 4/1993 | Ishikawa et al. | 395/95 |
| 5,209,131 | 5/1993 | Baxter | 73/865.8 |
| 5,220,260 | 6/1993 | Schuler | 318/561 |
| 5,223,776 | 6/1993 | Radke et al. | 318/568.1 |
| 5,228,356 | 7/1993 | Chuang | 74/471 |
| 5,230,623 | 7/1993 | Guthrie et al. | 433/72 |
| 5,235,868 | 8/1993 | Culver | 74/471 XY |
| 5,239,246 | 8/1993 | Kim | 318/568 |
| 5,254,919 | 10/1993 | Bridges et al. | 318/560 |
| 5,264,768 | 11/1993 | Gregory et al. | 318/561 |
| 5,286,203 | 2/1994 | Fuller et al. | 434/45 |
| 5,296,846 | 3/1994 | Ledley | 345/161 |
| 5,296,871 | 3/1994 | Paley | 345/163 |
| 5,327,790 | 7/1994 | Levin et al. | 73/862.325 |
| 5,341,459 | 8/1994 | Backes | 395/95 |
| 5,355,148 | 10/1994 | Anderson | 345/166 |
| 5,374,942 | 12/1994 | Gilligan et al. | 345/157 |
| 5,389,865 | 2/1995 | Jacobus et al. | 318/568.11 |
| 5,396,266 | 3/1995 | Brimhall | 345/161 |
| 5,398,044 | 3/1995 | Hill | 345/145 |
| 5,402,582 | 4/1995 | Raab | 33/503 |
| 5,405,152 | 4/1995 | Katanics et al. | 273/438 |
| 5,414,337 | 5/1995 | Schuler | 318/561 |
| 5,473,235 | 12/1995 | Lance et al. | 318/561 |
| 5,477,237 | 12/1995 | Parks | 345/156 |
| 5,482,051 | 1/1996 | Reddy et al. | 128/733 |
| 5,512,919 | 4/1996 | Araki | 345/156 |
| 5,513,100 | 4/1996 | Parker et al. | 364/167.01 |
| 5,551,701 | 9/1996 | Bouton et al. | 463/36 |
| 5,570,111 | 10/1996 | Barrett et al. | 345/157 |
| 5,576,727 | 11/1996 | Rosenberg et al. | 345/179 |
| 5,587,937 | 12/1996 | Massie et al. | 364/578 |
| 5,589,828 | 12/1996 | Armstrong | 341/20 |
| 5,589,854 | 12/1996 | Tsai | 345/161 |
| 5,591,082 | 1/1997 | Jensen et al. | 463/38 |
| 5,611,731 | 3/1997 | Bouton et al. | 463/37 |
| 5,623,582 | 4/1997 | Rosenberg | 395/99 |
| 5,629,594 | 5/1997 | Jacobus et al. | 318/568.11 |
| 5,642,469 | 6/1997 | Hannaford et al. | 395/99 |
| 5,643,087 | 7/1997 | Marcus et al. | 463/38 |
| 5,656,901 | 8/1997 | Kurita | 318/436 |
| 5,666,138 | 9/1997 | Culver | 345/161 |
| 5,680,141 | 10/1997 | Didomenico et al. | 342/372 |
| 5,691,898 | 11/1997 | Rosenberg et al. | 364/190 |
| 5,694,153 | 12/1997 | Aoyagi et al. | 345/161 |
| 5,709,219 | 1/1998 | Chen et al. | 128/782 |
| 5,714,978 | 2/1998 | Yamanaka et al. | 345/157 |
| 5,721,566 | 2/1998 | Rosenberg et al. | 345/161 |
| 5,724,068 | 3/1998 | Sanchez et al. | 345/161 |
| 5,724,264 | 3/1998 | Rosenberg et al. | 364/559 |
| 5,727,188 | 3/1998 | Hayes | 395/500 |
| 5,731,804 | 3/1998 | Rosenberg | 345/156 |
| 5,734,373 | 3/1998 | Rosenberg et al. | 345/161 |
| 5,742,278 | 4/1998 | Chen et al. | 345/156 |
| 5,749,577 | 5/1998 | Couch et al. | 273/148 B |
| 5,754,023 | 5/1998 | Roston et al. | 318/561 |
| 5,755,577 | 5/1998 | Gillio | 434/262 |
| 5,760,764 | 6/1998 | Martinelli | 345/160 |
| 5,767,839 | 6/1998 | Rosenberg | 345/161 |
| 5,769,640 | 6/1998 | Jacobus et al. | 434/262 |
| 5,771,037 | 6/1998 | Jackson | 345/157 |
| 5,781,172 | 7/1998 | Engel et al. | 345/164 |
| 5,790,108 | 8/1998 | Salcudean et al. | 345/184 |
| 5,805,140 | 9/1998 | Rosenberg et al. | 345/161 |
| 5,818,426 | 10/1998 | Tierney et al. | 345/161 |
| 5,821,920 | 10/1998 | Rosenberg et al. | 345/156 |
| 5,823,876 | 10/1998 | Unbehand | 463/37 |
| 5,825,308 | 10/1998 | Rosenberg | 341/20 |
| 5,828,197 | 10/1998 | Martin et al. | 318/567 |
| 5,831,593 | 11/1998 | Rutledge | 345/156 |
| 5,841,428 | 11/1998 | Jaeger et al. | 345/184 |
| 5,844,392 | 12/1998 | Peurach et al. | 318/568.17 |
| 5,872,438 | 2/1999 | Roston | 318/568.11 |
| 5,877,748 | 3/1999 | Redlich | 345/163 |
| 5,889,670 | 3/1999 | Schuler et al. | 364/186 |
| 5,959,613 | 9/1999 | Rosenberg et al. | 345/161 |

OTHER PUBLICATIONS

Louis Rosenberg, "A Force Feedback Programming Primer," Immersion Corporation, 1997, pp. 1–176.

Patrick Fischer et al., "Specification and Design of Input Devices for Teleoperation," IEEE CH2876–1, 1990, pp. 540–545.

J. Edward Colgate et al., "Implementation of Stiff Virtual Walls in Force–reflecting Interfaces," Dept. of Mechanical Engineering, Northwestern Univ., Evanston IL. 1993, pp. 1–7.

Antal K. Bejczy et al., "The Phantom Robot: Predictive Displays for Teleoperation with Time Display," IEEE CH2876–1, 1990, pp. 546–550.

Louis B. Rosenberg, "The Use of Virtual Fixtures as Perceptual Overlays to Enhance Operator Performance in Remote Environments" Crew Systems Directorate Biodynamics and Biocommunications Div., Wright–Patterson AFB OH 45433–7901, 1992, pp. 1–42.

Louis B. Rosenberg, "Virtual Fixtures as Tools to Enhance Operator Performance in Telepresence Environments," SPIE Telemanipulator Technology, 1993.

Louis B. Rosenberg, "Perceptual Design of a Virtual Rigid Surface Contact", Armstrong Laboratory, Crew Systems Directorate, Air Force Materiel Command, 1993, pp. 1–40.

Bernard D. Adelstein et al., "A High Performance Two Degree–of–freedom Kinesthetic Interface", MIT, Cambridge, MA, 1992, pp. 108–112.

Tan, H. et al., "Human factors for the design of force–reflecting haptic interfaces", Dept. Of Mech Engineering, MIT, 1994, pp. 1–11.

Tetsuo Kotoku, "A Predictive Display with Force Feedback and its Application to Remote Manipulation System with Transmission Time Delay", IEEE 0–7803–0737–2, 1992, pp. 239–246.

Louis B. Rosenberg et al., "The use of force feedback to enhance graphical user interfaces," Stereoscopic Displays and Virtual Reality Systems, Proc. SPIE 2653, 19, 1996, pp. 243–248.

Bernard D. Adelstein et al., "Design and Implementation of a Force Reflecting Manipulandum for Manual Control Research" NASA Ames Research/Dept. of Mechanical Engineering, MIT, 1992, pp. 1–24.

Pietro Buttolo et al., "Pen–based Force Display for Precision Manipulation in Virtual Environments", IEEE 0–8186–7084–3, 1995, pp. 217–224.

Brain Schmult et al., "Application Areas for a Force–feedback Joystick", DSC–vol. 49, Advances in Robotics, Mechatronics, and Haptic Interfaces, 1993, pp. 47–54.

S.C. Jacobson et al., "High Performance, High Dexterity, Force Reflective Teleoperator II", ANS Topical Meeting on Robotics and Remote Systems, 1991, pp. 1–10.

Margaret Minsky, et al., "Feeling and Seeing: Issues in Force Display", Dept. of Computer Science, University of NC at Chapel Hill, ACM 1990 089791–351–5, pp. 235–242, 270.

Koichi Hirota et al., "Development of Surface Display", IEEE 0–7803–1363–1, 1993, pp. 256–262.

A.J. Kelley et al., "Magicmouse: Tactile and Kinesthetic feedback in the Human–compute Interface Using an Electromagnetically Actuated Input/output Device", Dept. of Electrical Engineering, University of British Columbia, Vancouver, BC, 1993, pp. 1–27.

Hiroo Iwata, "Aritificial Reality with Force–feedback: Development of Desktop Virtual Space with Compact Master Manipulator", ACM 0–89791–344–2, 1990, pp. 165–170.

Vincent Hayward et al. "Design and Multi–Objective Optimization of a Linkage for a Haptic Interface," Advances in Robot Kinematics and Computationed Geometry, Kluwer Academic Publishers, 1994, pp. 359–368.

Kilpatrick, Paul Jerome, "The Use of Kinesthetic Supplement in an Interactive Graphics System", University of North Carolina at Chapel Hill, 1976, pp. 1–175.

Winey III, Calvin, "Computer Simulated Visual and Tactile Feedback as an Aid to Manipulator and Vehicle Control," Dept. of Mech. Engineering, MIT, 1981, pp. 1–79.

Hannaford, B. et al., "Performance Evaluation of a Six–Axis Generalized Force–Reflecting Teleoperator," IEEE Transactions on Systems, Man, and Cybernetics, vol. 21, No. 3, 1991, pp. 620–623, 631–633.

Atkinson, W. et al., "Computing with Feeling," Comput. & Graphics, vol. 2, 1977, pp. 97–103.

Millman, Paul et al., "Design of a Four Degree–of–Freedom Force–Reflecting Manipulandum with a Specified Force/Torque Workspace," Proc. of 1991 IEEE Int'l Conf. on Robotics and Automation, IEEE, 1991, pp. 1488–1493.

Howe, R. et al., "Task Performance with a Dextrous Teleoperated Hand System," Telemanipulator Technology '92, Proc. of SPIE, vol. 1833, 1992, pp. 1–9.

Batter, J. et al., "Grope–1: A Computer Display to the Sense of Feel," Proc. IFIP Congress 1971, pp. 759–763.

Ouh–young, M., "Force Display in Molecular Docking," Dept. of Computer Science, Univ. of N. Carolina at Chapel Hill, 1990, pp. 1–12, 66–85.

Ellis, R.E. et al., "Design and Evaluation of a High–Performance Prototype Planar Haptic Interface," DSC–vol. 49, Advances in Robotics, Mechatronics, and Haptic Interfaces, ASME 1993, pp. 55–64.

Rosenberg, L. et al., "Commercially Viable Force Feedback Controller for Individuals with Neuromotor Disabilities," Crew Systems Directorate, Wright–Patterson AFB, 1996, pp. 1–33.

Gotow, J.K. et al., "Perception of Mechanical Properties at the Man–Machine Interface," IEEE CH2503–1, 1987, p. 688–689.

McAffee et al., "Teleoperator Subsystem/Telerobot Demonstrator: Force Reflecting Hand Controller Equipment Manual," Jet Propulsion Laboratory–California Institute of Technology, 1988, pp. 1–11.

Russo, "The Design and Implementation of a three Degree–of–Freedom Force Output Joystick," May 11, 1990, Dept. of Mech. Engineering, 1990.

Snow et al., "Compact Force–Reflecting Hand Controller," NASA Tech Brief, vol. 15, No. 4, Item #153, 1991, pp. 1–15a.

J.N. Herndon, et al., "The State–of–the–Art Model M–2 Maintenance System," 1984, 1984 Topical Meeting on Robotics and Remote Handling in Hostile Environments, pp. 59–66.

Meyer et al., "A Survey of Position Trackers," Presence, vol. 1, No. 2, 1992, pp. 173–200.

POSITION SENSING FOR FORCE FEEDBACK DEVICES

CROSS REFERENCE TO RELATED APPLICATIONS

This application is a continuation-in-part of co-pending parent patent application Ser. No. 09/058,259, filed Apr. 10, 1998, on behalf of Martin et al., entitled "Improvements for Force Feedback Transmission Mechanisms", assigned to the assignee of the present application, and which is incorporated by reference herein.

BACKGROUND OF THE INVENTION

The present invention relates generally to interface devices between humans and computers, and more particularly to computer interface devices that provide force feedback to the user.

Interface devices are used extensively with computer systems in the implementation of computer-controlled games, simulations, and other applications very popular with the mass market of home consumers. In a typical implementation, a computer system displays a visual environment to a user on a display device. Users can interact with the displayed environment by inputting commands or data from the interface device. Popular interface devices include joysticks, "joypad" button controllers, mice, trackballs, styluses, tablets, pressure spheres, foot or hand pedals, or the like, that are connected to the computer system controlling the displayed environment. The computer updates the environment in response to the user's manipulation of a moved manipulandum such as a joystick handle or mouse, and provides visual feedback to the user using the display screen.

In some interface devices, haptic (e.g., tactile) feedback is also provided to the user, more generally known as "force feedback." These types of interface devices can provide physical sensations to the user manipulating the physical object of the interface device. Typically, motors or other actuators of the interface device are coupled to the manipulandum and are connected to the controlling computer system. The computer system receives sensor signals from the interface device and sends appropriate force feedback control signals to the actuators in conjunction with host events. The actuators then provide forces on the manipulandum. A local microprocessor can be used to offload some computational burden on the host. The computer system can thus convey physical sensations to the user in conjunction with other visual and auditory feedback as the user is contacting the manipulandum. Commercially available force feedback devices include the ForceFX joystick from CH Products, Inc. and Immersion Corporation, and the Sidewinder Force Feedback Pro from Microsoft Corporation.

One problem occurring in providing commercially available force feedback devices with realistic forces is providing a low cost device. Such components as belt drive transmissions can be used to reduce manufacturing costs. However, one problem occurring with many types of belt drives is that an amount of compliance or backlash is typically inherent in the system caused by the flexibility or stretching of the belts. Other types of transmissions also may introduce compliance into a system, as well as various types of linkages or gimbal mechanisms which provide the degrees of freedom to the manipulandum of the force feedback device. The compliance can also be derived from plastic or other flexible components used in low-cost devices.

The compliance and backlash in a force feedback mechanical system can cause problems in accurately sensing the position of the manipulandum. This can be a particular problem in those systems having significant compliance between the manipulandum and the sensor. The user may have moved the manipulandum a small distance, but due to the compliance this change in position is only partially detected or not detected at all by the sensor, or is detected too long after the event for the device to provide meaningful forces in reaction to the change in position. This is especially of concern when the position sensor is rigidly coupled to the actuator to sense motion by sensing rotation or movement of the actuator shaft (and where the manipulandum is compliant-coupled to the sensor), as is commonly done in force feedback devices to provide greater sensing resolution with a given sensor and to provide more stable control of the device.

Another problem involved with inaccurate position reporting in a force feedback device is related to sensing the position of the manipulandum near the limits to provided degrees of freedom. For example, force feedback devices typically provide hard stops to limit the motion of the manipulandum to a constrained range. Due to compliance in the mechanical and/or drive system, the problem of sensing the position of the manipulandum is exacerbated at the hard stops. For example, when the user moves the manipulandum fast against the hard stop, the compliance in the system may allow further motion past the hard stop to be sensed by the sensor due to compliance and inertia. However, when the manipulandum is moved slowly, the inertia is not as strong, and the sensor may not read as much extra motion past the hard stop. These two situations can cause problems in sensing an accurate position consistently.

Yet another problem with position sensing can occur upon startup of a force feedback device. If a device uses relative or incremental sensors, as many force feedback devices do, then a controlling microprocessor or host computer does not immediately know the starting position of the manipulandum when the device is first powered. This can cause problems when defining a range of motion for the manipulandum. The assumption that the manipulandum is at the center of the full range of motion can cause problems since the startup position may actually be very close to or at a limit such as a hard stop, and the manipulandum cannot be moved very far before this limit is reached even though the controller expects a much larger range of motion. Dynamic calibration can be used, where the range of the device is considered nominal at startup and is gradually increased as the sensors detect the manipulandum at ever-increasing ranges. However, a problem can exist for force feedback devices that provide this type of dynamic calibration and which use a software centering spring upon startup, which is not a physical spring but a spring force controlled by the device and output by the actuators which centers the manipulandum in its range of motion. If the range of the manipulandum is made small and then allowed to increase, then the default spring at startup will cause instability in the device, i.e., the manipulandum will oscillate due to the device sensing tiny motions as large motions within the small range, which causes the effective gain of the control loop to be too high for the position range.

SUMMARY OF THE INVENTION

The present invention provides improvements in the sensing of position of a manipulandum of a force feedback device. The features of the present invention are useful for more accurately sensing manipulandum position of a force feedback device that includes compliance in its mechanical systems, and for calibrating a force feedback device having relative sensors.

More particularly, one aspect of the present invention compensates for sensing inaccuracies contributed to by compliance in the mechanical systems of a force feedback device is provided. The force feedback device is coupled to a host computer and includes at least one actuator for outputting forces and a sensor. A raw sensor value of a position of a manipulandum of the force feedback device is read in a range of motion of the manipulandum, the manipulandum, such as a joystick handle, being grasped by a user. The raw sensor value is adjusted based on a compliance of the force feedback device between sensor and manipulandum, where the adjustment compensates for the compliance to provide a more accurate position of the manipulandum. The adjusted sensor value is used as the position of the manipulandum when, for example, updating an application program implemented by the host computer. Preferably, a microprocessor local to the force feedback device adjusts the sensor value and reports the adjusted sensor value to the host computer.

The adjusting of the raw sensor value preferably includes adjusting the raw sensor value based on a compliance constant and a current output force, where the compliance constant has been previously determined. When the force feedback device performs the adjustment, the adjusted sensor value is reported to the host computer as the position of the manipulandum. The raw (unadjusted) sensor value can be used to determine closed-loop position-dependent forces by, for example, a microprocessor local to the interface device. The sensor can be coupled to the actuator such that the sensor detects movement of an actuator shaft. The force feedback device can include a variety of linkages and transmission systems, such as a belt drive for transmitting forces from the actuator to the manipulandum.

In another aspect of the present invention, a range of motion of a manipulandum of a force feedback device is dynamically calibrated, where the force feedback device is coupled to a host computer and includes an actuator and at least one relative sensor. A predetermined initial range of movement for the manipulandum is assigned when the force feedback device is initially powered. The initial range includes two boundary values, a maximum value and a minimum value. A sensor value representing a position of the manipulandum in the range of movement is received as the manipulandum is moved. The maximum value or minimum value is set to the received sensor value if the received sensor value is outside the initial range. The other boundary value not set to the received sensor value is adjusted to maintain the initial range between the maximum value and the minimum value unless this other boundary value has been previously detected outside the initial range. This allows the initial range to be maintained until new maximum and minimum points are detected dynamically. The initial range is greater than zero and is less than an entire physical range of motion of the manipulandum to confer stability on the device upon startup, where the manipulandum is considered to be positioned at about a center of the initial range when the force feedback device is initially powered.

Another aspect of the present invention provides accurate sensing of position of a manipulandum in a force feedback device that includes compliance between the manipulandum and a position sensor of the force feedback device using filtering. A raw sensor value of a position of a manipulandum is read in a range of motion of the manipulandum that is grasped by a user. The raw sensor value is filtered for overshoot sensor values occurring at limits to the range of motion of said manipulandum. The range of motion of the manipulandum is dynamically calibrated by adjusting minimum and maximum values of the range of motion based on the extent of motion of the manipulandum and using the filtered sensor value. The filtering can, for example, use a low pass filter on the raw sensor data. Preferably, the unfiltered raw sensor value is used for determining a position of the manipulandum in the range of motion. The dynamic calibration also may include assigning an initial range with initial maximum and initial minimum values and maintaining the initial range between the minimum and maximum values until both minimum and maximum values are detected outside the initial range.

In another aspect of the present invention, sensing inaccuracies contributed to by compliance in the mechanical systems of a force feedback device are compensated for by using a normalization procedure. A raw sensor value is read describing a position of a manipulandum in a range of motion. The raw sensor value is normalized to a normalized range of motion, including providing a saturation zone at each end of the normalized range that adjusts sensor values over a saturation level to the saturation level, where the saturation levels are provided at the ends of the normalized range. The normalized sensor value is reported to the host computer, and the host computer updates an application program using the normalized sensor value. The normalizing can use a normalizing function, such as a linear function having saturation levels at its ends. If the raw sensor value is adjusted based on a compliance of the force feedback device as above, the adjusted sensor value is preferably normalized to the normalized range of motion and is reported to the host computer. The raw, unadjusted sensor value can be normalized and used for local closed-loop determination of forces by a local microprocessor.

The improvements of the present invention provide more accurate sensing of the position of the manipulandum in a force feedback device, and are especially applicable to low cost force feedback devices provided for competitive consumer markets, in which compliance in the mechanical system can be significant. The compliance compensation, filtering, and normalization features of the present invention provide accurate positions of the manipulandum to the host computer regardless of compliance between manipulandum and sensor, and regardless of other characteristics in the sensors, actuators, and mechanical system leading to inaccurate position sensing. The dynamic calibration of the present invention provides accurate calibration for relative sensors and prevents instability of the device at startup. These improvements allow a low-cost force feedback device to provide more precise position sensing and more realistic force sensations to the user.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
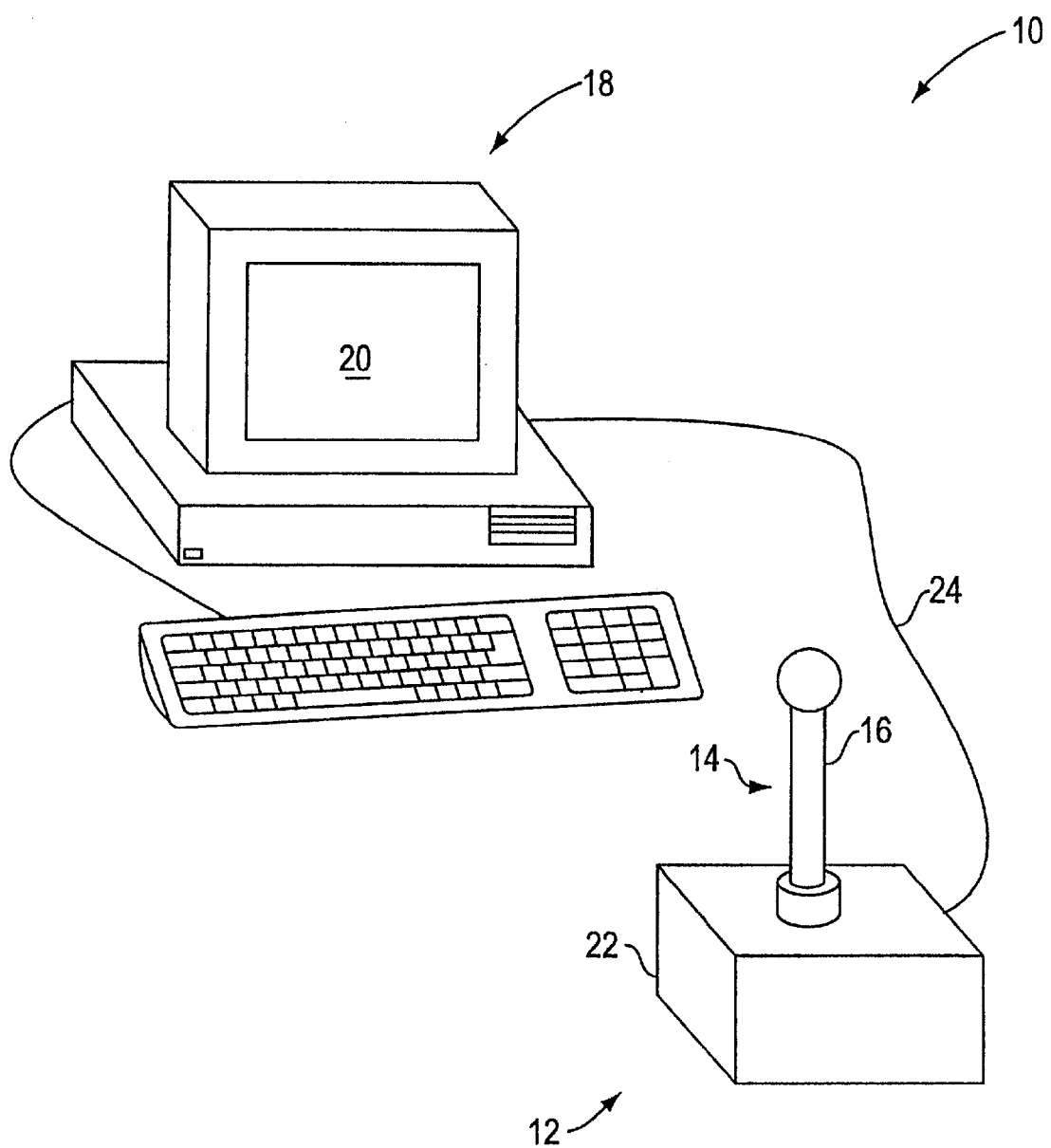
FIG. 1 is a perspective view of a force feedback system which includes a host computer and a force feedback interface device.

In FIG. 1, a force feedback system 10 for use with the present invention preferably includes a force feedback interface device 12 and a host computer 18. The illustrated system 10 can used for a virtual reality simulation, computer/video game, training procedure or simulation, computer application program, or other application. In one preferred embodiment, a manipulandum 14 is grasped by a user and manipulated in one or more degrees of freedom of motion. Images are displayed on a display apparatus, such as screen 20, of the computer 18 in response to such manipulations.

The computer 18 can be a personal computer or workstation, such as an IBM-PC compatible computer, Macintosh personal computer, or a SUN or Silicon Graphics workstation. Most commonly, the digital processing system is a personal or portable computer which operates under the Windows™, Unix, MacOS, or other operating system and may include a host microprocessor such as a Pentium class microprocessor, PowerPC, DEC Alpha, or other type of microprocessor. Alternatively, host computer system 18 can be one of a variety of home video game systems commonly connected to a television set, such as systems available from Nintendo, Sega, or Sony. In other embodiments, host computer system 18 can be a "set top box" which can be used, for example, to provide interactive television functions to users, or a "network-" or "internet-computer" which allows users to interact with a local or global network using standard connections and protocols such as used for the Internet and World Wide Web.

Host computer 18 preferably implements a host application program with which a user is interacting via manipulandum 14 and other peripherals, if appropriate, and which can include force feedback functionality. The software running on the host computer 18 may be of a wide variety. For example, the host application program can be a simulation, video game, Web page or browser that implements HTML or VRML instructions, scientific analysis program, virtual reality training program or application, or other application program that utilizes input of manipulandum 14 and outputs force feedback commands to the manipulandum 14. For example, many game application programs include force feedback functionality and may communicate with the force feedback interface device 12 using a standard protocol/ drivers such as I-Force available from Immersion Corporation. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor or a simulated cockpit of an aircraft might be considered a graphical object.

Display device 20 can be included in host computer 18 and can be a standard display screen (LCD, CRT, etc.), 3-D goggles, or any other visual output device. Typically, the host application provides images to be displayed on display device 20 and/or other feedback, such as auditory signals. For example, display screen 20 can display images from a game program.

The interface device 12 as illustrated in FIG. 1 is used to provide an interface to the application running on host computer 18. For example, a manipulandum (or "user manipulatable object" or "user object") 14 grasped by the user in operating the device 12 may be a joystick handle 16 movable in one or more degrees of freedom, as described in greater detail subsequently. It will be appreciated that a great number of other types of manipulandums can be used with the method and apparatus of the present invention. In fact, the present invention can be used with any mechanical object where it is desirable to provide a human/computer interface with one to six degrees of freedom. Such objects may include joysticks, styluses, surgical tools used in medical procedures, catheters, hypodermic needles, wires, fiber optic bundles, screw drivers, pool cues, etc.

A housing 22 of the interface device 12 includes a mechanical apparatus for interfacing mechanical input and output. The mechanical apparatus mechanically provides the degrees of freedom available to the manipulandum 16 and allows sensors to sense movement in those degrees of freedom and actuators to provide forces in those degrees of freedom. The mechanical apparatus is described in greater detail below. The mechanical apparatus is adapted to provide data from which a computer or other computing device such as a microprocessor (see FIG. 2) can ascertain the position and/or orientation of the manipulandum as it moves in space. This information is then translated to an image on a computer display apparatus such as screen 20.

An electronic interface is also included in housing 22 of interface device 12. The electronic interface couples sensors and actuators of the device 12 to the computer 18. A suitable electronic interface is described in detail with reference to FIG. 2. The electronic interface is coupled to a mechanical apparatus within the interface device 12 and to the computer 18 by a cable 24. In other embodiments, signals can be transmitted between interface device 12 and computer 18 by wireless transmission and reception.

Figure 2:
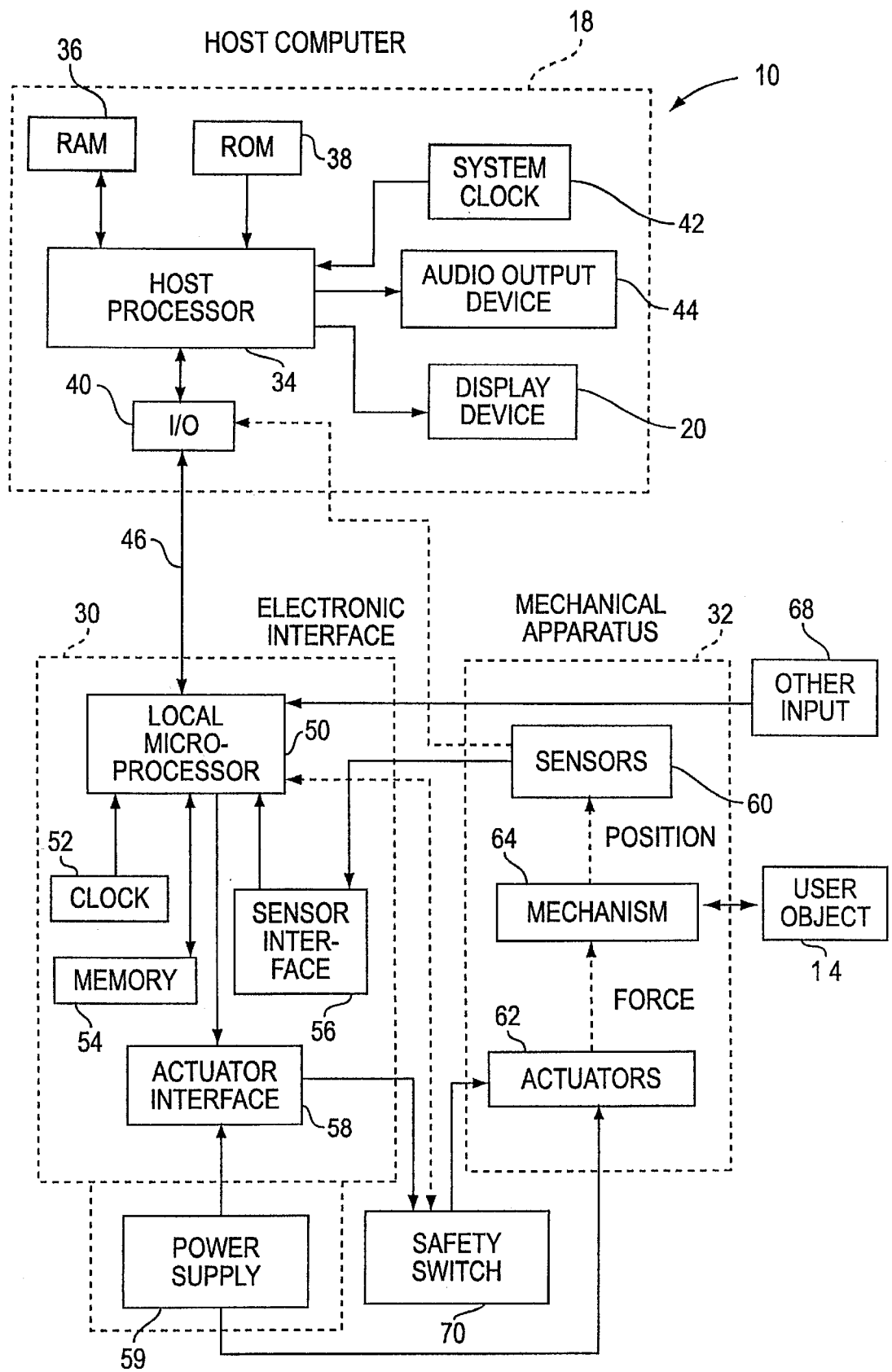
FIG. 2 is a block diagram of the force feedback system of FIG. 1.

FIG. 2 is a block diagram illustrating interface device 12 and host computer 18 suitable for use with the present invention. Interface device 12 includes an electronic interface 30, mechanical apparatus 32, and manipulandum 14. A similar system is described in detail in U.S. Pat. No. 5,734, 373 which is hereby incorporated by reference herein in its entirety.

As explained with reference to FIG. 1, computer 18 is preferably a personal computer, workstation, video game console, or other computing or display device. Host computer system 18 commonly includes a host microprocessor 34, random access memory (RAM) 36, read-only memory (ROM) 38, input/output (I/O) electronics 40, a clock 42, a display device 20, and an audio output device 44. Host microprocessor 34 can include a variety of available microprocessors from Intel, AMD, Motorola, or other manufacturers, and can be single chip, multiple chip, co-processors, etc. Microprocessor 34 preferably retrieves and stores instructions and other necessary data from RAM 36 and ROM 38 as is well known to those skilled in the art. In the described embodiment, host computer system 18 can receive sensor data or a sensor signal via a bus 46 from sensors of device 12 and other information. Microprocessor 34 can receive data from bus 46 using I/O electronics 40, and can use I/O electronics to control other peripheral devices. Host computer system 18 can also output commands to interface device 12 via bus 46 to cause force feedback for the interface system 10.

Clock 42 is a standard clock crystal or equivalent component used by host computer 18 to provide timing to electrical signals used by host microprocessor 34 and other components of the computer system 18 and can be used to provide timing information that may be necessary in determining force or position values. Display device 20 is described with reference to FIG. 1. Audio output device 44, such as speakers, can be coupled to host microprocessor 34 via amplifiers, filters, and other circuitry well known to those skilled in the art. Other types of peripherals can also be coupled to host processor 34, such as storage devices (hard disk drive, CD ROM drive, floppy disk drive, etc.), printers, and other input and output devices.

Electronic interface 30 of device 12 is coupled to host computer system 18 by a bi-directional bus 46. The bi-directional bus sends signals in either direction between host computer system 18 and the interface device 12. Bus 46 can be a serial interface bus, such as USB, RS-232, or Firewire (IEEE 1394), providing data according to a serial communication protocol, a parallel bus using a parallel protocol, or other types of buses. An interface port of host computer system 18, such as a USB or RS-232 serial interface port, connects bus 46 to host computer system 18.

Electronic interface 30 can include a local microprocessor 50, local clock 52, local memory 54, sensor interface 56, and actuator interface 58. Interface 30 may also include additional electronic components for communicating via standard protocols on bus 46. In various embodiments, electronic interface 30 can be included in mechanical apparatus 32, in host computer 18, or in its own separate housing. Different components of interface 30 can be included in device 12 or host computer 18 if desired.

Local microprocessor 50 preferably coupled to bus 46 and may be closely linked to mechanical apparatus 14 to allow quick communication with other components of the interface device. Processor 50 is considered "local" to interface device 12, where "local" herein refers to processor 50 being a separate microprocessor from any processors 34 in host computer 18. "Local" also preferably refers to processor 50 being dedicated to force feedback and sensor I/O of the interface system 10, and being closely coupled to sensors and actuators of the device 12. Microprocessor 50 can be provided with software instructions to wait for commands or requests from computer host 18, parse/decode the command or request, and handle/control input and output signals according to the command or request. In addition, processor 50 preferably operates independently of host computer 18 by reading sensor signals and calculating appropriate forces from those sensor signals, time signals, and force processes selected in accordance with a host command, and output appropriate control signals to the actuators. Suitable microprocessors for use as local microprocessor 50 include the 8X930AX by Intel, the MC68HC711E9 by Motorola or the PIC16C74 by Microchip, for example. Microprocessor 50 can include one microprocessor chip, or multiple processors and/or co-processor chips. In other embodiments, microprocessor 50 can include digital signal processor (DSP) functionality.

For example, in one host-controlled embodiment that utilizes microprocessor 50, host computer 18 can provide low-level force commands over bus 46, which microprocessor 50 directly transmits to the actuators. In a different local control embodiment, host computer system 18 provides high level supervisory commands to microprocessor 50 over bus 46, and microprocessor 50 manages low level force control loops to sensors and actuators in accordance with the high level commands and independently of the host computer 18. In the local control embodiment, the microprocessor 50 can process inputted sensor signals to determine appropriate output actuator signals by following the instructions of a "force process" that may be stored in local memory 54 and includes calculation instructions, formulas, force magnitudes, or other data. The force process can command distinct force sensations, such as vibrations, textures, jolts, or even simulated interactions between displayed objects. The host can send the local processor 50 a spatial layout of objects in the graphical environment so that the microprocessor has a mapping of locations of graphical objects and can determine force interactions locally. Force feedback used in such embodiments is described in greater detail in co-pending patent application Ser. No. 08/879,296 and U.S. Pat. No. 5,734,373, both of which are incorporated by reference herein.

A local clock 52 can be coupled to the microprocessor 50 to provide timing data, similar to system clock 42 of host computer 18; the timing data might be required, for example, to compute forces output by actuators 30. Local memory 54, such as RAM and/or ROM, is preferably coupled to microprocessor 50 in interface 30 to store instructions for microprocessor 50 and store temporary and other data. Microprocessor 50 may also store calibration parameters and the state of the force feedback device in a local memory 54.

Sensor interface 56 may optionally be included in electronic interface 30 to convert sensor signals to signals that can be interpreted by the microprocessor 50 and/or host computer system 18. For example, sensor interface 56 can receive and convert signals from a digital sensor such as an encoder or from an analog sensor using an analog to digital converter (ADC). Such circuits, or equivalent circuits, are well known to those skilled in the art. Alternately, microprocessor 50 can perform these interface functions or sensor signals from the sensors can be provided directly to host computer system 18. Actuator interface 58 can be optionally connected between the actuators of device 12 and microprocessor 50 to convert signals from microprocessor 50 into signals appropriate to drive the actuators. Interface 58 can include power amplifiers, switches, digital to analog controllers (DACs), and other components well known to those skilled in the art. Power supply 59 can optionally be coupled to actuator interface 58 and/or actuators 62 to provide electrical power. Alternatively, if the USB or a similar communication protocol is used, actuators and other components can draw power from the USB from the host computer. Alternatively, power can be stored and regulated by interface device 12 and thus used when needed to drive actuators 62.

Mechanical apparatus 32 is coupled to electronic interface 30 and preferably includes sensors 60, actuators 62, and mechanism 64. Sensors 60 sense the position, motion, and/or other characteristics of a manipulandum 14 along one or more degrees of freedom and provide signals to microprocessor 50 including information representative of those characteristics. Typically, a sensor 60 is provided for each degree of freedom along which object 14 can be moved, or, a single compound sensor can be used for multiple degrees of freedom. Example of sensors suitable for embodiments described herein are digital rotary optical encoders, which sense the change in position of an object about a rotational axis and provide digital signals indicative of the change in position. Linear optical encoders may similarly sense the change in position of object 14 along a linear degree of freedom. A suitable optical encoder is the "Softpot" from U.S. Digital of Vancouver, Wash. Alternatively, analog sensors such as potentiometers can be used. It is also possible to use non-contact sensors at different positions relative to mechanical apparatus 32, such as Polhemus (magnetic) sensors for detecting magnetic fields from objects, or an optical sensor such as a lateral effect photo diode having an emitter/detector pair. In addition, velocity sensors (e.g., tachometers) and/or acceleration sensors (e.g., accelerometers) can be used. Furthermore, either relative or absolute sensors can be employed.

Actuators 62 transmit forces to manipulandum 14 in one or more directions along one or more degrees of freedom in response to signals output by microprocessor 50 and/or host computer 18, i.e., they are "computer controlled." Typically, an actuator 62 is provided for each degree of freedom along which forces are desired to be transmitted. Actuators 62 can include two types: active actuators and passive actuators. Active actuators include linear current control motors, stepper motors, pneumatic/hydraulic active actuators, a torquer (motor with limited angular range), a voice coil actuator, and other types of actuators that transmit a force to an object. Passive actuators can also be used for actuators 62, such as magnetic particle brakes, friction brakes, or pneumatic/hydraulic passive actuators, and generate a damping resistance or friction in a degree of motion. In some embodiments, all or some of sensors 60 and actuators 62 can be included together as a sensor/actuator pair transducer.

Figure 3:
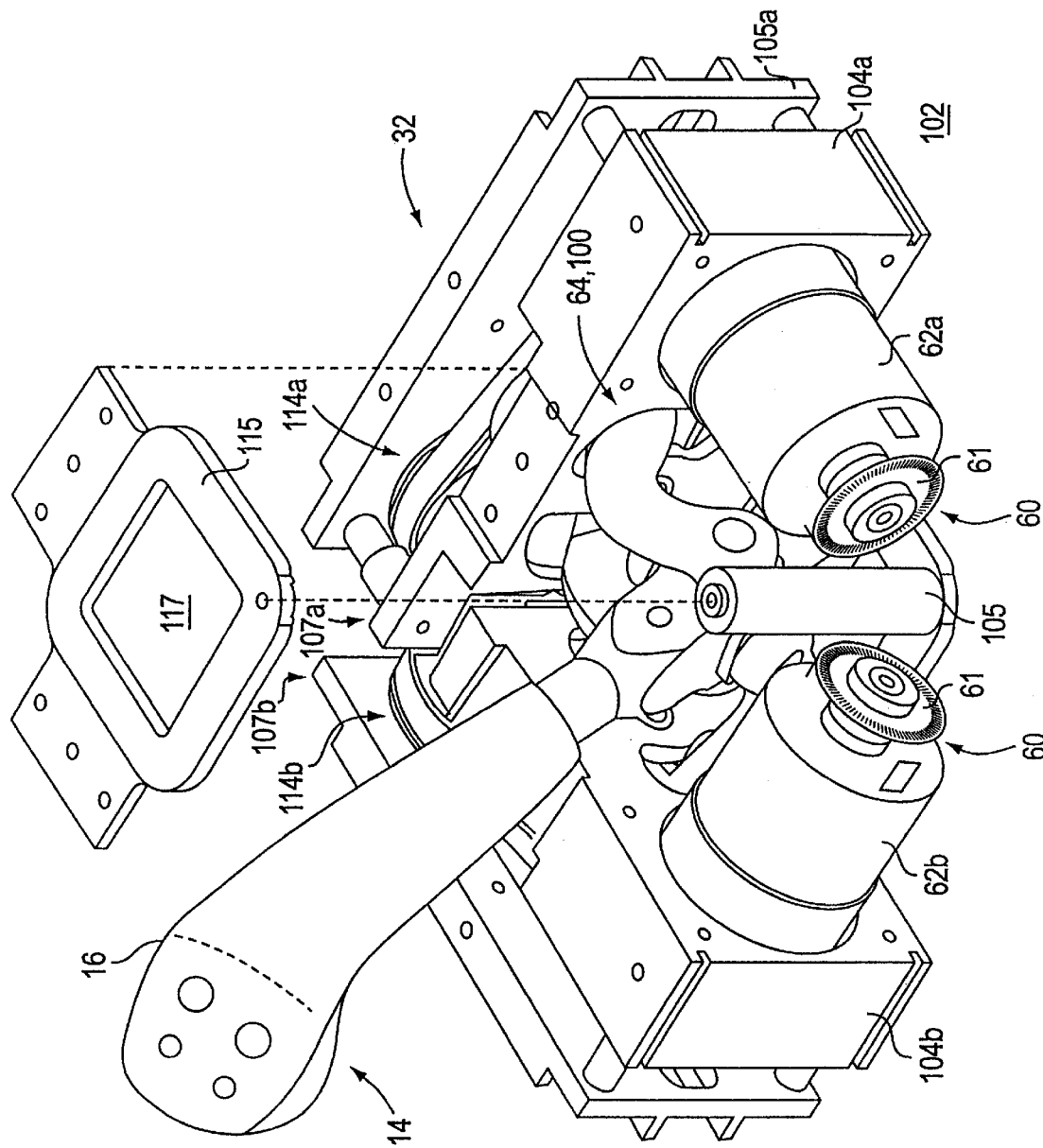
FIG. 3 is a perspective view of a preferred embodiment of the force feedback interface device of FIG. 2.
Figure 4:
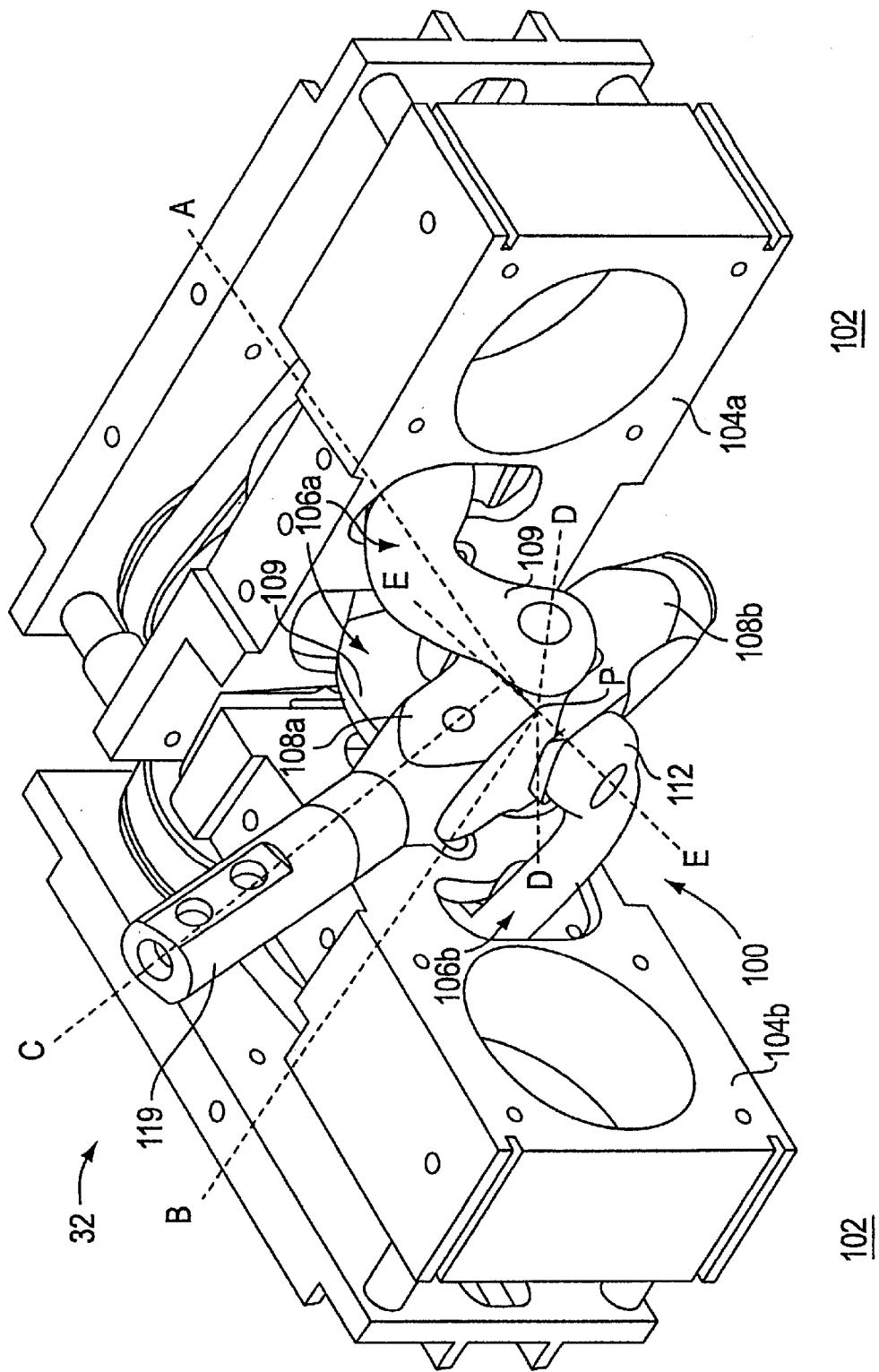
FIG. 4 is a perspective view of the embodiment of the force feedback interface device of FIG. 3 detailing the linkage mechanism of the device.

Mechanism 64 can be one of several types of mechanisms. One embodiment of a mechanism is shown in FIGS. 3–4. Other mechanisms may also be used, such as mechanisms disclosed in U.S. Pat. Nos. 5,576,727; 5,731,804; 5,721,566; 5,691,898, 5,805,140, 5,820,197 and 5,767,839 and co-pending patent applications Ser. Nos. 08/664,086, 08/709,012, 08/881,691, 08/961,790, and 08/965,720, all hereby incorporated by reference herein in their entirety. Manipulandum 14 can be a joystick, or other device or article coupled to mechanism 64, as described above.

Other input devices 68 can optionally be included in interface system 10 and send input signals to microprocessor 50 and/or host computer 18. Such input devices can include buttons, such as buttons on joystick handle 16, used to supplement the input from the user to a game, simulation, GUI, etc. Also, dials, switches, voice recognition hardware (with software implemented by host 18), or other input mechanisms can be used. Safety or "deadman" switch 70 is preferably included in interface device to provide a mechanism to allow a user to override and deactivate actuators 62, or require a user to activate actuators 62, for safety reasons. The safety switch can alternatively be implemented as software instructions implemented by microprocessor 50.

FIG. 3 is a perspective view of one embodiment of the mechanical portion 32 and manipulandum 14 of interface device 12 and suitable for use with the present invention. The described embodiment is a joystick apparatus including two rotary degrees of freedom, where a joystick handle 16 can be moved forward and back in one degree of freedom, and left and right in the other degree of freedom.

Mechanism 64 is provided as a gimbal mechanism 100 which couples the manipulandum 14 to a grounded or reference surface 102. Gimbal mechanism 100 is preferably a five-member, closed-loop parallel linkage and is described in greater detail below with reference to FIG. 4. Gimbal mechanism 100 provides two degrees of freedom to handle 16. Joystick handle 16 is coupled to one of the members of gimbal mechanism 100 such that it extends out of the sphere defined by the rotational degrees of freedom of the handle 16. Other types of mechanisms for providing degrees of freedom to manipulandum 14 may be used as well, as described above.

Mechanical apparatus also includes belt drive mechanisms 114a and 114b. Belt drive mechanisms 114 are included in mechanical portion 32 to provide mechanical advantage to the output of actuators 62 without introducing as much backlash to the system as other types of transmission systems. The belt drive mechanisms 114 are described in greater detail with respect to FIG. 5. It should be noted that other types of drive and force amplification mechanisms may also be used, such as cable drive systems, gear systems, etc. Those drive systems including some sort of compliance are especially suitable for use with the accurate sensing features of the present invention.

Also preferably coupled to mechanical portion 32 are sensors 60 and actuators 62 and provide input to and output from the electrical system. Such transducers are preferably coupled such that the belt drive is positioned between the sensor/actuator and the gimbal mechanism 100. Transducers that can be used with the present invention are described in greater detail with respect to FIG. 2. In the described embodiment, actuators 62 include two grounded actuators 62a and 62b. The housing of grounded actuator 62a is preferably coupled to ground member 104. A rotational shaft (rotor) of actuator 62a is coupled to the belt drive mechanism 114a to apply forces to the joystick handle 16 in a first revolute degree of freedom (linear actuators can be provided in alternate embodiments). Grounded actuator 62b preferably corresponds to grounded transducer 62a in function and operation, where actuator 62b is coupled to the grounded member 104 and applies forces to the joystick handle 16 in the second revolute degree of freedom.

Actuators 62, in the described embodiment, are preferably linear current control motors, such as DC servo motors. These motors preferably receive current signals to control the direction and torque (force output) that is produced on a shaft; the control signals for the motor are produced by microprocessor 50 as explained above. Such motors typically operate at stall in a force feedback device to transmit the forces to the manipulandum grasped by the user. The motors may include brakes which allow the rotation of the shaft to be halted in a short span of time. A suitable motor to be used as actuators 62 is the 600LG series manufactured by Johnson Electric. In alternate embodiments, other types of motors or actuators can be used, such as a stepper motor controlled with pulse width modulation of an applied voltage, pneumatic/hydraulic motors, voice coil actuators, or passive actuators (magnetic particle brakes, pneumatic/hydraulic passive brakes, etc).

It should be noted that the rotatable components of the mechanical portion 32 will only actually rotate in space if the user is not applying the same amount of rotational force to handle 16 in the opposite direction to cancel the rotational force of the actuator. In this case, either the force of the user or the force from the actuators 62 will move the manipulandum and coupled components in their respective degrees of freedom. In any event, the user will feel the rotational force from the actuators 62 along the associated degree of freedom on handle 16 as force feedback.

Sensors 60 are, in the described embodiment, coupled to the actuators 62a and 62b. One portion of the sensor is grounded by being coupled to the housing of the actuator 62, which is itself grounded. A rotary shaft or encoder wheel of each sensor is rigidly coupled to the rotor of the corresponding actuator 62, such that the sensor detects any motion caused by the output force of the actuator. The sensors 60 also detect any rotary motion of the rotor caused by the user moving the joystick 16. For example, in one embodiment, sensors 60 are relative optical encoders which provide signals to measure the angular rotation of the shaft of the sensor. An encoder wheel 61 can be provided on the shaft with a number of slots. A beam emitter and a detector are positioned on opposing sides of the encoder wheel to detect the number of slots that have rotated past the detector, so that the rotation of the sensor shaft is detected. The operation of such encoders are well known to those skilled in the art. The electrical outputs of the encoders are routed to microprocessor 50 (or host computer 18) as detailed above. In other embodiments, other types of sensors can be used, such as analog potentiometers or other analog or digital sensors as described above. It should be noted that the present invention can utilize both absolute and relative sensors.

The sensors 60 can advantageously be coupled directly to the rotating shafts of actuators 62 such that the belt drive is positioned between the sensor/actuator and the gimbal mechanism/manipulandum. This configuration provides greater resolution to a given sensor when detecting a given motion of manipulandum 14, since the motion is amplified by the drive system (e.g. a belt drive) by the time it is sensed by the sensor at actuator 62 (the drive system also amplifies forces in the other direction, from the actuator to the manipulandum). In addition, the sensor can sense direct motion of the actuator in this configuration, which allows the microprocessor or host computer to know exactly when forces have been output from the motor. In most prior art force feedback devices, sensors that are directly coupled to the actuators do not detect the position of the manipulandum in its degrees of freedom as accurately as desired, since the sensor is far removed from the manipulandum and compliance or other errors in the system cause inaccurate sensor readings. However, the compliance compensation feature of the present invention allows a sensor to be directly coupled to an actuator yet still sense the position of the manipulandum with sufficient accuracy regardless of compliance in the system. The compliance compensation feature is described in greater detail with respect to FIG. 6.

A plate 115 is also shown in FIG. 3 which is shown in an exploded view above its normal connected position to grounded member 104 and a grounded post 105. Plate 115 includes an aperture 117 through which the joystick handle 16 normally extends. The limits of aperture 117 acts as hard stops to the motion of the joystick 16 in the two rotary degrees of freedom. A second similar plate (not shown) to plate 115 or fence (or other obstruction) can also be provided at the bottom of the device for providing hard stops for a portion of joystick 16 which extends to the bottom of the device. Hard stops can be located in other areas of the device in other embodiments, such as on or near the gimbal mechanism 100.

FIG. 4 is a perspective view of the mechanical portion 32 of interface device 12 detailing the gimbal mechanism 100. Gimbal mechanism 100 couples the manipulandum 14 to a grounded or reference surface 102. All or some of the components of gimbal mechanism 100 (and other components) can be made of metal, or, in a preferred low-cost embodiment, rigid plastic. Gimbal mechanism 100 is preferably a five-member, closed-loop parallel linkage that includes a ground member 104, extension members 106a and 106b, and central members 108a and 108b. Ground member 104 is provided as a base member which provides stability for device 12 on a grounded surface 102, such as a table top, floor, desk top, or other reference surface (grounded member 104 is shown as members 104a and 104b, which are both directly coupled to ground 102). The members of gimbal mechanism 100 are rotatably coupled to one another through the use of bearings or pivots, wherein extension member 106a is rotatably coupled to ground member 104 and can rotate about an axis A, central member 108a is rotatably coupled to extension member 106a and can rotate about a floating axis D, extension member 106b is rotatably coupled to ground member 104 and can rotate about axis B, central member 108b is rotatably coupled to extension member 106b and can rotate about floating axis E, and central member 108a is rotatably coupled to central member 108b at or near a center point P at the intersection of axes D and E. A bearing (not shown) connects the two central members 108a and 108b together near the intersection point P. Central drive member 108a is rotatably coupled between two protrusions 109 of extension member 106a which are preferably bent out of the plane of axes AB as shown. Similarly, central link member 108b is rotatably coupled between two protrusions 112 of extension member 106b which bend out of the AB plane in the opposite direction to protrusions 109. The axes D and E are "floating" in the sense that they are not fixed in one position as are axes A and B. Axes A and B are substantially mutually perpendicular. Extension members 106 of gimbal mechanism 100 are also coupled to belt drive mechanisms 114a and 114b, which are described in greater detail with respect to FIG. 5.

Gimbal mechanism 100 is formed as a five-member ("five-bar") closed chain. Each end of one member is coupled to the end of another member. The five-bar linkage is arranged such that extension member 106a, central member 108a, and central member 108b can be rotated about axis A in a first degree of freedom. The linkage is also arranged such that extension member 106b, central member 108b, and central member 108a can be rotated about axis B in a second degree of freedom. A similar structure is also disclosed in co-pending patent application Ser. No. 09/138,304, filed concurrently herewith, by Bruneau et al., entitled, "Improvements in Mechanical and Force Transmission for Force Feedback Devices", and U.S. Pat. No. 5,731,804, both of which are incorporated by reference herein.

Joystick handle 16 (not shown) is coupled to one of the central members 108a or 108b (member 108a in FIG. 4) of gimbal mechanism 100 such that it extends out of the plane defined by axes D and E. An extension 119 can be coupled to or be part of central member 108a to which the joystick handle 16 is attached; alternatively, the extension 119 (or a longer similar member) of the central member 108a can itself be the manipulandum 14, such as joystick handle 16. Gimbal mechanism 100 provides two rotary degrees of freedom to extension 119. The extension 119 can be rotated about axis A or axis B or have a combination of rotational movement about these axes. In alternate embodiments, additional degrees of freedom can be provided for handle 16/extension 119, such as rotation about floating axis C extending perpendicularly from the plane formed by floating axes D and E; or linear translation along floating axis C. Either or both of these degrees of freedom can be provided with a sensor and/or an actuator to sense motion and apply forces in the degrees of freedom.

Figure 5:
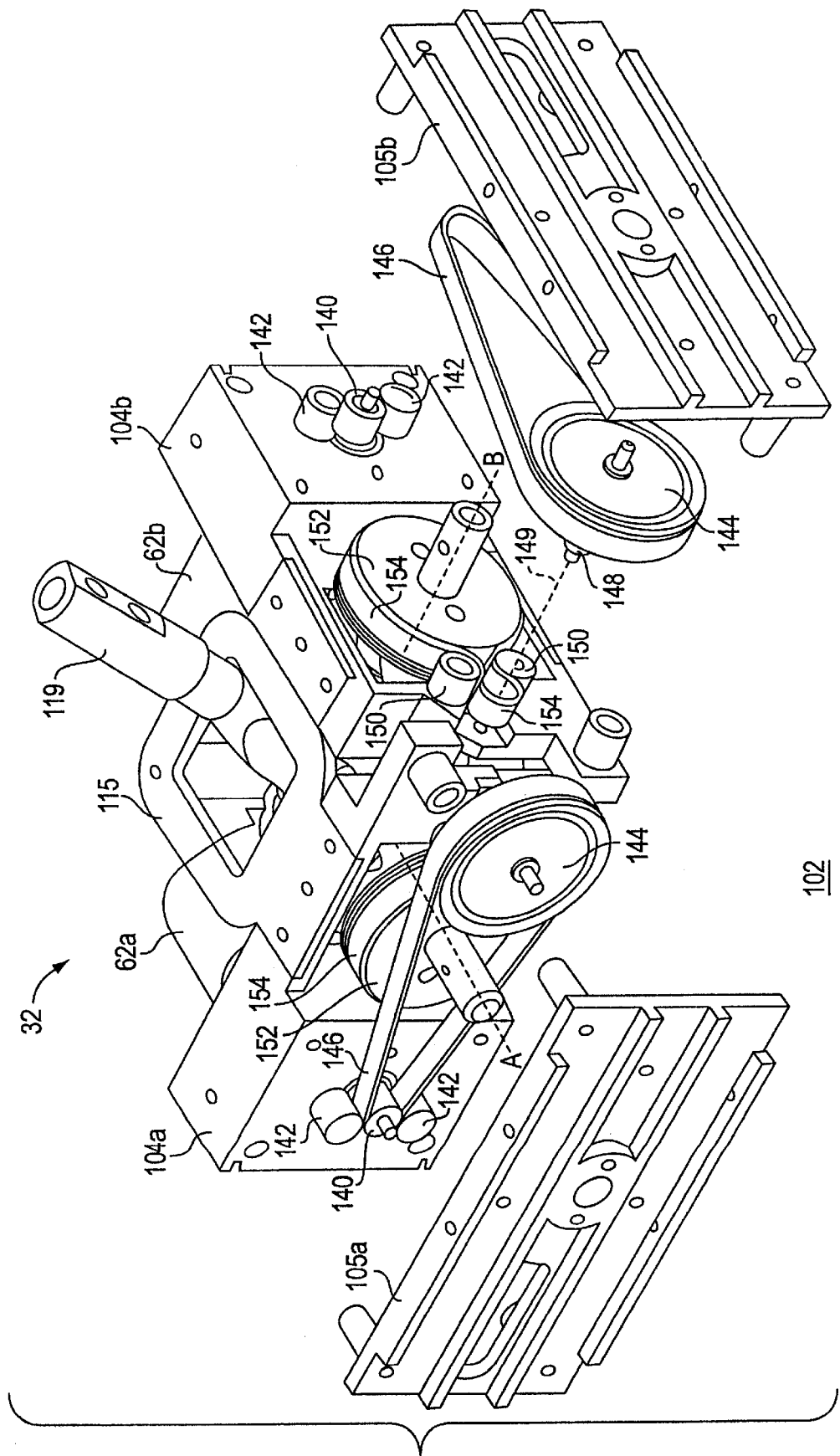
FIG. 5 is a perspective view of a the belt transmission system of the embodiment of FIG. 3.

FIG. 5 is a partially exploded perspective view of the mechanical apparatus 32 showing belt drive mechanisms 114a and 114b. The belt drive mechanisms 114 are provided between the actuators 62 and the extension members 106 of the gimbal mechanism 100. Each belt drive mechanism 114 includes a first stage and a second stage, where the first stage includes drive pulley 140, passive idlers 142, first amplification pulley 144, and first belt 146, and where the second stage includes transmission pulley 148, active idlers 150, second amplification pulley 152, and second belt 154.

The first stage includes drive pulley 140, which is coupled to the rotor of actuator 62. Drive pulley 140 may rotate freely when the actuator 62 is unpowered and may be driven in either rotational direction when the actuator is powered. First belt 146 is wrapped around drive pulley 140 and is also wrapped around first amplification pulley 144. Belt 146 preferably includes teeth on one side or other gripping features that engage teeth of drive pulley 140 and amplification pulley 144. Passive idlers 142 are positioned adjacent to drive pulley 140, preferably not contacting the drive pulley or belt 146. The passive idlers are provided to prevent the belt 146 from jumping off or moving radially away from drive pulley 140 when slack or compliance is present in first belt 146.

The second stage includes driven pulley 148, which is rigidly coupled to first amplification pulley 144 and is positioned such that second belt 154 is wrapped around pulley 148, as indicated by dashed line 149. The assembly of pulley 144/pulley 148 is rotatably coupled to ground member 104 and other ground member 105. Second amplification pulley 152 is rigidly coupled to extension member 106 of the gimbal mechanism 100. Second belt 152 is wrapped around transmission pulley 148 and second amplification pulley 152, and is routed around the active idlers 150 which are located at intermediate positions between pulleys 148 and 152 as shown. Active idlers 150 are positioned such that the belt 152 is routed between the driven pulley 148 and the active idlers 150. Active idlers 150 are in constant rolling action with the second belt 154 to increase the belt wrap angle (i.e. to increase the number of teeth engaged). Belt 154 preferably includes teeth on one side or other gripping features that engage teeth of driven pulley 148 and amplification pulley 152.

The belt drive mechanisms 114 operate as follows. Actuator 62 outputs a rotational force on drive pulley 140, which rotates the pulley 140. This rotation causes first belt 146 to move and rotate pulley 144, which amplifies the rotation of the pulley 140 based on the ratio between the radial sizes of pulley 144 and pulley 140. Pulley 148 rotates with pulley 144 and drives second belt 154, which in turn rotates pulley 152. Pulley 152 amplifies the rotational motion of pulley 148 based on the ratio between the radial sizes of pulley 148 and pulley 152.

The belt drive mechanism 114 provides a mechanical advantage to the output forces of actuators 62 so that the force output of the actuators is increased. The ratio of the diameter of pulley 144 to the diameter of pulley 140, and the ratio of the diameter of pulley 152 to pulley 148, dictates the amount of mechanical advantage, similar to a gear system. Since there are two stages, each providing amplification to the forces output by actuator 62, the total amplification to the forces is the product of the amplification provided by each stage. The belt drive system of FIG. 5 is described in greater detail in copending application Ser. No. 09/138,304, by Bruneau et al., entitled, "Improvements in Mechanical and Force Transmission for Force Feedback Devices", previously incorporated herein by reference.

Compliance Compensation and Accurate Position Sensing

The force feedback device described above implements compliance compensation and other processes of the present invention to allow accurate position sensing and thus more realistic force sensations.

Force feedback devices often have compliance in the mechanical systems of the devices. The compliance can be introduced from a particular drive or amplification transmission, through a poor fit of parts of the device, molding tolerances of parts, etc. For example, when using the belt drive mechanisms for force/motion transmission as described above with reference to FIG. 5, an amount of compliance is usually present in the system due to the inherent flex of the belts, minor slipping of the belts relative to the pulleys, and/or other factors. Compliance can also be introduced through other types of drive mechanisms, linkage mechanisms, or materials in a force feedback device. For example, linkages made of plastic or other materials having some flex can provide undesired compliance, as can stiff linkages provided in a plastic housing or case that may flex. Gear drives can provide compliance if gears or other components are made of such materials. In cable systems, relatively large free lengths of cable where the cable does not contact a linkage or surface can provide compliance. Compliance can be introduced from a particular mechanical design and/or by manufacturing difficulties and tolerances.

A problem occurs when sensing the position of the manipulandum with the sensors of the force feedback device having such compliance. If the sensors are directly coupled to moving members of the force feedback mechanism close to the manipulandum, then the compliance may not add significantly to the inaccuracies of sensing the manipulandum position. However, if the sensor is coupled to the actuator to sense the rotation of the actuator shaft as an indication of manipulandum position, as provided in the embodiment 32 described above, then the compliance in the system can add significant inaccuracies to the position sensing. This is because the compliance in such a system exists between the sensor and the manipulandum and causes the manipulandum to be at a different position than the sensed actuator shaft that is coupled to the manipulandum. For example, the actuator may output a vibration on the manipulandum; the sensor would sense the actuator shaft rotating alternatingly in two directions at a particular frequency. However, the compliance in the transmission system may "absorb" the vibration forces such that the manipulandum does not actually move in physical space at all. The sensor would thus be sensing motion when no motion of the manipulandum actually occurs.

The inaccuracies of this position sensing can particularly have an adverse effect when hard stops or limits are provided on the manipulandum end of the compliance. For example, the plate 115 described in FIG. 3 provides hard stops for the joystick handle 16. When the joystick is positioned at the limit of travel, the actuator position can vary largely depending on the speed with which the device impacts the hard stop and on the force exerted by the actuator. If there is no force output by the actuator and the user impacts the joystick with the hard stop at a significant velocity, then the inertia of the actuator will cause the actuator to rotate past the range of motion in which the joystick can normally be moved at a slow velocity. This typically results in the sensors detecting too large a range of motion at the end of the joystick's range. Because the mechanical system is compliant, the actuator will not remain at the extended location, but will return to a position as the linkage and/or belt bends back to a neutral position. However, the position returned to may still be outside the range that is normally allowed when moving the manipulandum toward the stop more slowly.

This problem is aggravated when applying force with the actuator. When the output force is constructive (i.e., tends to push the manipulandum against the stop), then the position range can exceed the range normally allowed when moving the manipulandum at slower velocities or without output force. If the output force is destructive (i.e., tends to resist motion of the manipulandum against the stop), then the position range can be reduced from the range normally allowed when moving the manipulandum slower or without output force.

To compensate for these variations in sensed movement range of the manipulandum, the present invention provides two compliance compensation features. First, the compliance of the linkage between the manipulandum and the actuator can be compensated for. If the compliance of the linkage is modeled, e.g. by the firmware (such as microprocessor 50) of the force feedback device, then the actual position of the manipulandum can be approximated by computing an position based on the modeled compliance and a computed output force value (which is assumed to be the actual force output by the actuator). This is described in greater detail below with reference to FIG. 6.

Second, the position readings that are determined can be filtered to eliminate overshoot sensor readings, especially the sensor readings received at the limits of the range of motion of the manipulandum. These overshoot readings are contributed by both compliance in the system and by the inertia of the actuators. Since the rapid impact of the manipulandum against the stop results in only a momentary overshoot of the sensor readings, this filtering typically need only be performed upon such impacts. This is described in greater detail with reference to FIGS. 6 and 7. The present invention also provides saturation regions when determining normalized positions to remove any inaccurate sensor readings occurring past the physical limits due to sensor deviation or compliance in the system, as described in greater detail with respect to FIG. 10.

The described embodiment of the present invention also preferably implements an automatic sensor calibration procedure to determine the limits to the range of motion of manipulandum 14, which is used to determine the position of the manipulandum 14 in its degrees of freedom. Although the hard stops limit the range of motion of handle 16 and thus provides a sensing range limit for sensors 60, some inaccuracies to the sensed range can still occur, especially based on manufacturing variances between devices. In a preferred embodiment, a dynamic calibration procedure is used, where the sensing range is determined dynamically for a particular device based on the range of motion of the handle sensed up to the current point in time. Thus, the limits (minimum and maximum sensor range values) that have been detected so far in each degree of freedom are considered to be the limits of the motion of the manipulandum, and these limits are increased as the manipulandum is moved closer to the actual physical limits over time (and more extreme sensor values are read). The sensing range eventually extends to the actual physical limits of the sensing range as the handle is moved to its limits during operation of the device as defined by the hard stops such as plate 115. At any time, the current sensor range is normalized to a standard range of values that the host computer expects to receive. Such a procedure is also described in co-pending patent applications Serial Nos. 08/970,953 and 09/058,259, incorporated by reference herein. A process of the present invention for dynamically sensing the range of the device without causing instability or inaccuracies at startup is described below with reference to FIGS. 6, 8 and 9.

Figure 6:
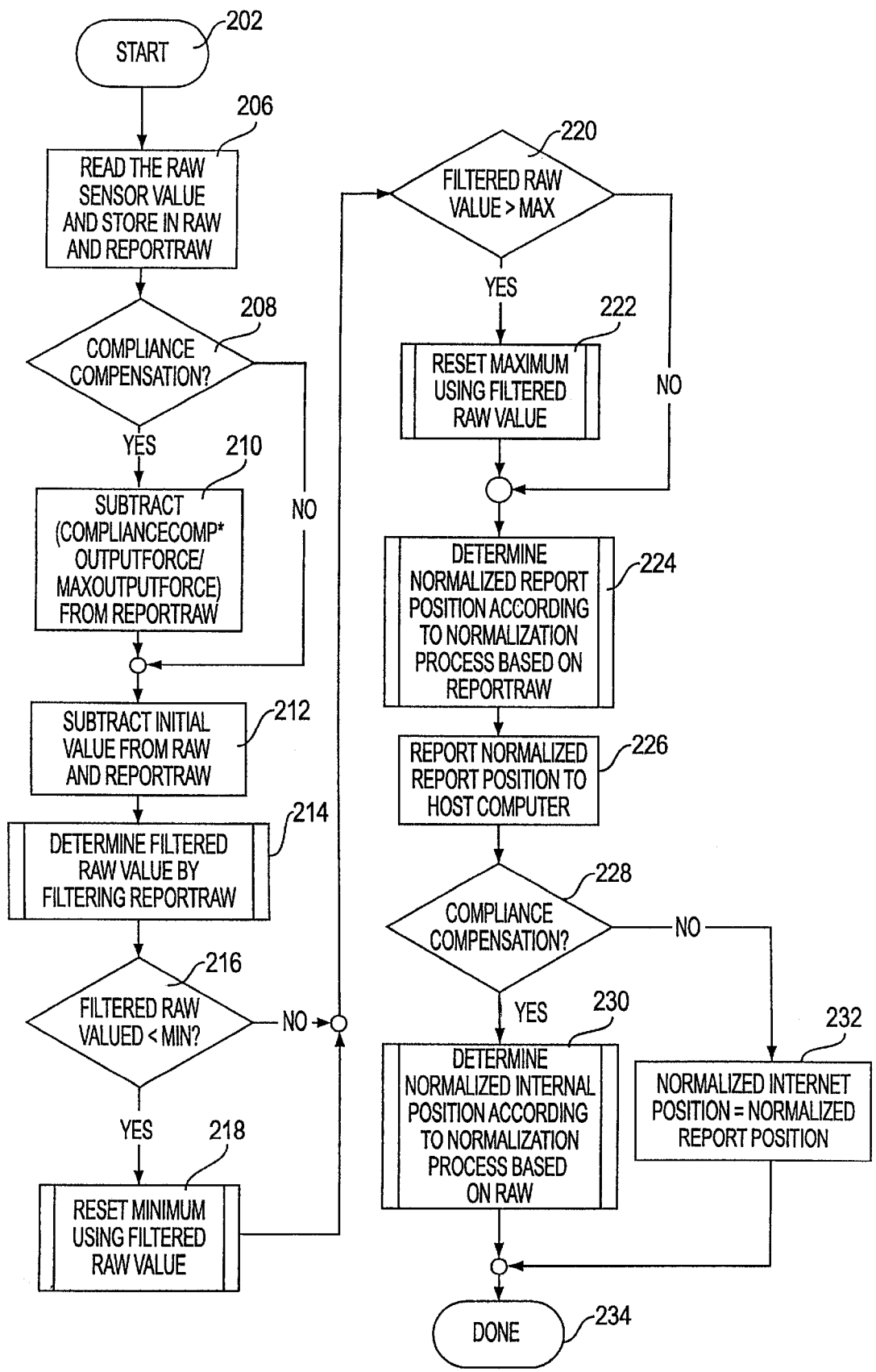
FIG. 6 is a flow diagram illustrating a method of the present invention providing compliance compensation and accurate position sensing.

FIG. 6 is a flow diagram illustrating a method of the present invention for compensating for compliance in a force feedback device and for accurately determining the position of the manipulandum. This process can be implemented with instructions implemented by the local microprocessor 50 of the force feedback device, and/or by instructions stored and processed on other local components such as local memory (RAM or ROM) or other computer-readable media (magnetic disks, optical storage discs, magnetic tape, etc.) (or instructions implemented by microprocessor 50 after receiving the instructions from host computer 18), other processors, dedicated state machines and/or logic, etc., and can be implemented in software, hardware, or a mixture of software and hardware, etc. Alternatively, the host computer 18 can perform some or all of the process steps, especially in those embodiments not providing adequate controller functionality in the device 12. It should be noted that process 200 should be performed for each degree of freedom of the force feedback device that is sensed and actuated and which includes enough compliance to benefit from the process.

Preferably, before the process of FIG. 6 is begun, an initialization is performed. The initialization includes setting an initial default range for the manipulandum, including initial minimum and maximum values. For example, in a preferred embodiment, the initial minimum and maximum values can be about the approximate raw sensor range divided by 4 (maximum) and a negative value of the approximate raw sensor range divided by 4 (minimum); this provides an initial range of one-half the full sensor range. The initialization also preferably includes storing an initial raw sensor value, which is the current value within the center of the desired sensor range. Finally, an optional initialization step can be performed to set an initial filter value to zero in those embodiments implementing an overshoot filter. This filter can be used to remove overshoot values from read positions of the manipulandum, as explained below.

The method begins at 202. In step 206, the current raw sensor value from the sensor 60 is read and stored in a variable Raw and in a variable ReportRaw. In step 208, the process checks whether compliance compensation is to be performed. Compliance compensation may not be performed in some instances since the present process can be used in force feedback devices in which compliance may not influence sensor readings as much as in other implementations, such as the belt drive transmission described with respect to FIG. 5. For example, force feedback devices using a capstan drive system and steel cable may not have as severe compliance in the system as in a belt drive system, and therefore may not need to use the compliance compensation of the present invention. If compliance compensation is not used, the process continues at step 212, described below.

If compliance compensation is to be used, then in step 210, the value (ComplianceComp *OutputForce/MaxOutputForce) is subtracted from the value of ReportRaw and the result is stored back in ReportRaw, where the OutputForce is the current force magnitude to be output on the manipulandum and the MaxOutputForce is the maximum force magnitude that can be produced by the actuator (negative or positive values are preferably used to indicate the direction of OutputForce in the degree of freedom).

ComplianceComp is a constant that has been determined to model the compliance of the system accurately. In a preferred embodiment, ComplianceComp represents the amount of deviation, in raw encoder counts, that is sensed due to compliance when the actuator 62 outputs maximum force. This constant is preferably determined previously in tests of the force feedback device. For example, a test is performed by outputting the maximum force of the actuators while the joystick handle is positioned against a hard stop. While the joystick is maintained at a constant position, the sensor will read a deviation in the actuator shaft due to the compliance. The compliance can optionally also be tested in the opposite directions, against the opposite hard stop, to provide more data in calculating the compliance constant. Thus, in step 210, the ComplianceComp value multiplied by the current output force, and divided by the maximum output force, provides a value that indicates the amount of deviation caused by the compliance in the system due to the magnitude of output force currently used. It is thus assumed that the deviation between manipulandum and sensor due to the compliance will change linearly with change in force magnitude, which is accurate enough for compliance compensation purposes. In other embodiments, however, different relationships can be used if it is found that the deviation due to compliance changes based on some other nonlinear function.

In step 212, the initial value read in the initialization step 204 is subtracted from the current ReportRaw value and the result is stored as ReportRaw; this normalizes the raw value to compensate for unusual startup (initial) sensor values. A similar subtraction is performed with the sensor value stored in the variable Raw. In next step 214, a Filtered Raw Value is determined based on a filtering process performed on ReportRaw. The filtering process removes any overshoot of the position of the manipulandum past the physical limits of the manipulandum, and is described in greater detail with respect to FIG. 7. In step 216, the process checks whether the Filtered Raw Value is less than a Min value, which is the minimum (filtered) sensor value that has been read so far. The device 12 preferably performs a dynamic calibration as described above, in which the limits of the manipulandum workspace are continually changing as the manipulandum is moved greater distances within the workspace and the old limits are surpassed. Thus, if the Filtered Raw Value is less than the Min value, the reset minimum process of step 218 assigns a lower sensor value as the new minimum and also may change the Max value, as described in greater detail with respect to FIG. 8. The process then continues to step 220. If the Filtered Raw Value is not less than Min in step 216, then step 220 is performed.

In step 220, the process checks whether the Filtered Raw Value is greater than a Max value, which is the maximum (filtered) sensor value that has been read from the sensor so far. If the Filtered Raw Value is greater than the Max value, then a new maximum limit to the manipulandum workspace is defined in step 222, which is described in greater detail in FIG. 9. After step 222, or if the Filtered Raw Value is not greater than Max, then step 224 is performed. In step 224, a Normalized Report Position is determined according to a normalization process, based on the ReportRaw value. Since the host computer expects to see a position value within a particular range, the ReportRaw value must be converted to the host's expected range, no matter how much of the sensed range of the device has been sensed so far in the dynamic calibration process. This normalization process converts the ReportRaw value to a normalized value, and is described in greater detail with respect to FIG. 10. The resulting Normalized Report Position is then reported to the host computer in step 226. It should be noted that step 226 can be performed at any point in the process after the Normalized Report Position is determined, or at any time before a new Normalized Report Position is determined.

After step 226, the process checks in step 228 whether compliance compensation is to be performed; as above in step 208, this typically depends on the device and the amount of compliance in the device. If compliance compensation is to be performed, then in step 230 a Normalized Internal Position is determined according to the normalization process detailed in FIG. 10 and is based on the Raw value instead of the ReportRaw value as in step 224. The Normalized Internal Position is the position that is used by the microprocessor and/or other firmware on the force feedback device for determining forces locally to be output to the manipulandum in position-based force sensations, such as springs, dampers, textures, etc. The internal position is different than the position reported to the host since it has not been adjusted based on the compliance of the device. This is because the determination of closed-loop (condition) forces by the microprocessor should be based on the raw sensor values without compliance compensation to prevent instability in the force feedback device. The sensor directly reads the rotational position of the actuator in the embodiment described above, and this allows more precise control of position, since the position of the actuators can be controlled more precisely than the position of the manipulandum. This also allows position-based forces to be determined by the device with no time lag between the output of a force and the sensing of the corresponding manipulandum position caused by compliance in the device transmission and/or linkage. If the compliance-compensated position were used in the determination of forces, this lag in time would cause an unstable control system in the device.

After the Normalized Internal Position is determined, the process is then complete at 234. If no compliance compensation is to be performed, then in step 232 the Normalized Internal Position is set equal to the Normalized Report Position. This reflects the fact that, when no compliance compensation is to be performed, the internal position is equal to the position reported to the host. Thus, the check 230 for compliance compensation is an optimization of process 350 to avoid unnecessarily calling the normalization process 350; step 230 can be omitted in alternate embodiments if such optimization is undesired. The process is then complete at 234.

After step 234, the process 200 is preferably repeated for each additional degree of freedom of the force feedback device which is sensed and actuated. The process 200 can also be performed simultaneously for each degree of freedom of the device. With respect to one degree of freedom, after step 234, the process returns to step 206 to read in another raw value and continue the calibration and determination of sensor values. Other steps, not shown, are also performed by the force feedback device, such as calculating forces, receiving commands from the host computer 18, and other tasks not necessary to describe in great detail herein.

Figure 7:
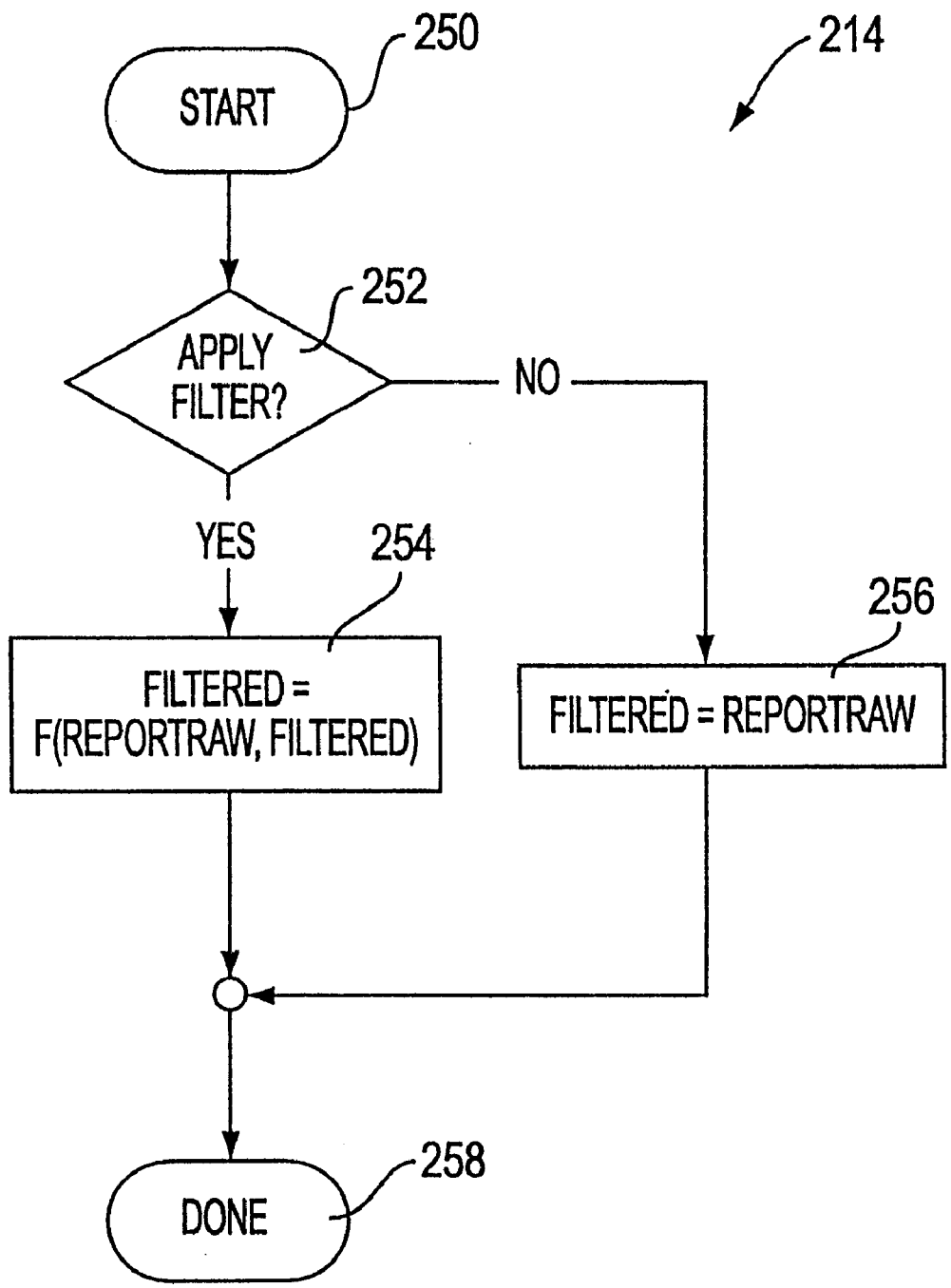
FIG. 7 is a flow diagram illustrating a filtering step of the method of FIG. 6.

FIG. 7 is a flow diagram illustrating the filter process step 214 of FIG. 6. The filter process of the present invention is used to remove any sensor data read during a momentary overshoot of the actuators when the manipulandum is moved against a hard stop at the limit of motion of the device. As explained above, when the manipulandum is impacted against a hard stop, the inertia of the actuator/mechanism/transmission and compliance in the force transmission may cause the actuator to continue moving in the direction corresponding to the movement of the manipulandum, while the manipulandum itself has stopped. This causes a momentary overshoot that is read by the sensor as a new greater limit to the device, when in actuality the limit is not as great as the sensor readings suggest. Filtering removes the overshoot data so as to prevent any false greater limits to the manipulandum workspace from being detected.

The process begins at 250. In step 252, the process checks whether to apply the filter or not. Depending on the embodiment of force feedback device 12 used, the actuators 62 and/or mechanism may not have a high enough inertia when operating to cause much of an overshoot problem (such as voice coil actuators). Or, the force feedback device may have a relatively large range of motion compared to the overshoot such that the overshoot does not significantly impact the force sensations output on the manipulandum. For example, a force feedback steering wheel device often has a large range of motion, where the wheel can be rotated a number of complete times, and where any overshoot by the inertia of the actuators may not be large enough with respect to the entire range to be worth spending processing time on filtering. In many joystick and similar devices, however, the range of motion is much smaller such that the overshoot can become a problem when determining range limits.

If the filter is not to be applied, the Filtered value determined by process 214 is set equal to the ReportRaw sensor value that was input to the process, and the ReportRaw value is then returned to the main process 200, i.e. no filtering is performed. The process is then complete at 258. If the filter is to be applied, then in step 254 the Filtered value is set equal to the result of a filtering function F which has an output based on the inputs of the (previous) Filtered value and the Report Raw sensor value. The function F can be any function that has been found to effectively filter out the overshoot data. For example, a single pole digital lowpass filter can be used. Since the overshoot is a short, momentary event, the low pass filter will filter out any such high frequency data by comparing the previous Filtered value with the ReportRaw value; when a large change is shown between them (high frequency), the ReportRaw value is set to a value closer to the previous value according to the filter; such types of filters are well known to those skilled in the art (e.g., the Filtered value=Filtered value+k (ReportRaw−previous Filtered value), where k is a constant less than 1). Once the filter is applied, the Filtered value is returned to the main process 200 of FIG. 6 and is stored as Filtered Raw Value, and the process is complete at "258". A different method for compensating for overshoots at the limits of the manipulandum range of travel is now described. A dynamic calibration procedure is used, where the sensing range of the device is determined dynamically for a particular device based on the range of motion of the handle sensed up to the current point in time. Thus, the limits (minimum and maximum sensor range values) that have been detected so far in each degree of freedom are considered to be the limits of the motion of the handle, and these limits are increased as the handle is moved closer to the actual physical limits over time (and more extreme sensor values are read). The sensing range eventually extends to the actual physical limits of the sensing range as the handle is moved to its limits during operation of the device as defined by plate 115.

As also explained above, due to flex or slop in the transmission system or other components of the device, innaccuracies can occur in position sensing. Since actuator forces may often be output in the same direction as the physical stop, the actuator forces can stress the transmission system so that one or more components in the transmission system move an additional amount while handle 16 is stopped by a plate 115 limit. The limits to the sensed range will be then be considered greater than when no forces are output, causing inaccuracies in the sensed position of the manipulandum.

To prevent detecting such a "false" limit caused by an actuator overstressing the transmission system, the calibration procedure can only read new sensor range limits when the actuator is not outputting a force in the direction of that limit. For example, the calibration procedure is preferably performed by instructions implemented by microprocessor 50 (or, alternatively, host computer 18) and is running during the normal operation of the force feedback device. The calibration procedure receives all sensor readings output by the sensors 60. The procedure checks if the sensor reading is greater than the maximum sensor value previously read (as determined from previous sensor readings), or if it is less than the minimum sensor value previously read. If neither is true, the sensor value is ignored by the calibration procedure. If the sensor value is greater than the maximum or less than the minimum, the procedure checks whether the sensor value was read during the output of any component of force by actuators 62 in the direction of the limit applicable to that sensor value. If so, then the calibration procedure ignores the sensor value since the actuator force may have stressed the transmission system past the physical limits provided when no actuator force is output. If no forces were output toward that limit, then that value becomes the new maximum or minimum in the sensed range. Thus, the calibration procedure only includes new maximum or minimum sensor values in the sensor range that are free from the influence of the actuator forces, so that the sensor range never extends past the range provided when no actuator forces are output. This method is described in greater detail in copending parent application Ser. No. 08/058,259, incorporated herein by reference.

Figure 8:
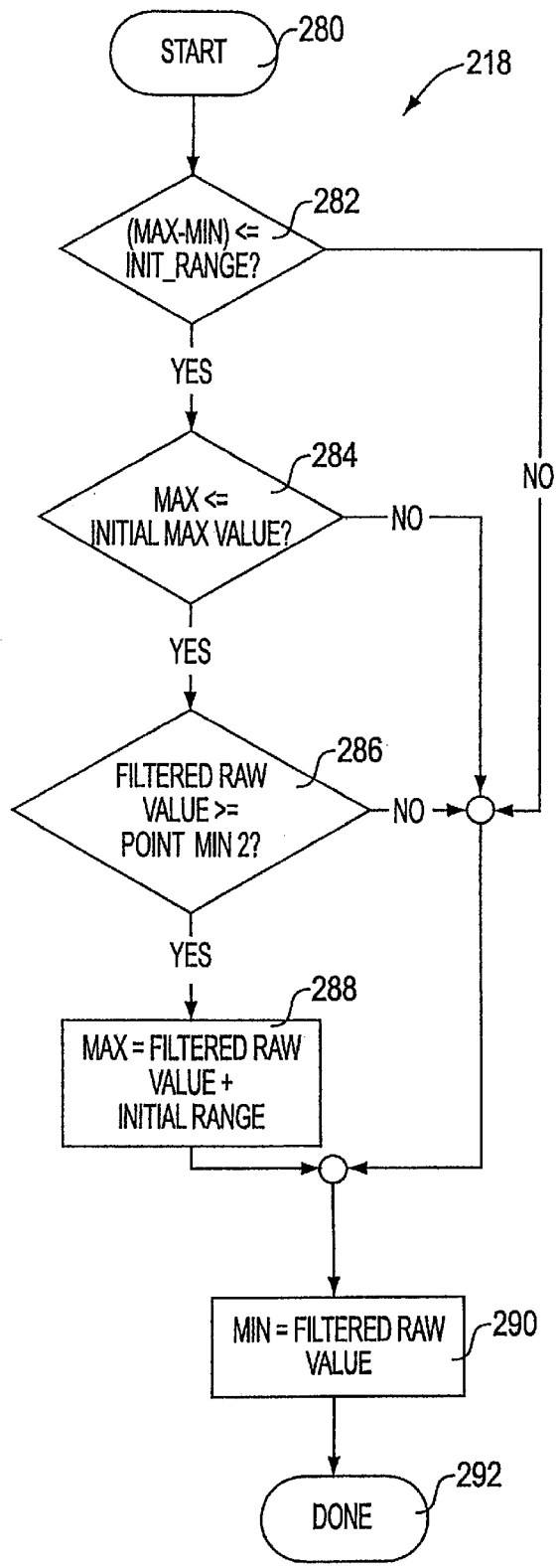
FIG. 8 is a flow diagram illustrating a step of FIG. 6 for setting a minimum of a dynamic range of the device.

FIG. 8 is a flow diagram illustrating step 218 of FIG. 6, in which a reset minimum process is performed to set a new minimum limit for the range of the manipulandum and to adjust the current maximum limit, if necessary. This process is used for force feedback devices 12 having relative sensors, since the microprocessor 50 does not know the position of the manipulandum at startup with respect to the actual, physical range of the device when relative sensors are used; only after the manipulandum has been moved in its workspace does the actual range of the device become apparent. The process of FIG. 8 provides a default range to the manipulandum upon startup and may adjust this default range as the manipulandum moves through its workspace. The default range is a range that is greater than zero, but which is less than the entire range of the device. This is because either a zero range or a large range, if assigned initially, can cause undesirable effects. The zero range (or a range close to zero) is undesirable because of the instability and oscillation that this causes upon startup of the device due to default "software spring" forces provided at startup (the default spring forces output from the actuator are preferably used to center the manipulandum in its workspace even when no actual force sensations are being instructed by an application program, and also when the device is idle). For example, since the entire range of the device would be very small at startup, and since the default spring has a force based on the distance moved in this range, the force will be very large since any tiny motion of the manipulandum will move it across a large portion of its range, which normalizes to a large distance. This translates to a large spring force, which causes the manipulandum to spring back and forth in an oscillating manner until a larger range has been travelled through and sensed. A large range is undesirable because the device may startup when the manipulandum is close to a range limit, so that some of the assigned range values are outside the achievable range of the manipulandum.

Figure 8A:
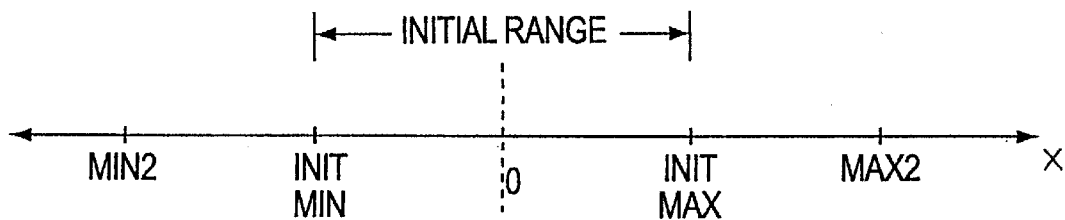
FIGS. 8a and 8b are diagrammatic illustrations of the dynamic range processed in FIG. 8.

The present invention provides an initial range at startup that is significantly smaller than the full range of the device and at the same time large enough that the default centering spring gains are stable. The device can assume that the manipulandum is centered in this initial range at startup. Then, as the manipulandum position changes, this initial range is then updated and changed according to actual sensed device limits, as described in the process 218. As described above, the initial range is preferably about one-half the approximate range of the raw sensor, although the initial range can be other sizes in other embodiments. The process 218 begins at 280, and in step 282, the process checks whether the size of the current range (Max–Min, where Max=the current maximum and Min=the current minimum) is less than or equal to the size of the initial range. The initial range is indicated in FIG. 8a, which represents a linear range of motion of the manipulandum in one degree of freedom for explanatory purposes, where O indicates the startup origin of the manipulandum. If the current range is greater than the initial range, then the current range has already been increased by a previous iteration of this process or process 222, and step 290 is performed, described below. If the current range is less than or equal to the initial range, then the process continues to step 284, in which the process checks whether Max is less than or equal to the initial maximum value set in the initialization step 204. If Max is greater than the initial maximum value, then the current range has already been increased by a previous iteration of the process 222 of FIG. 9, and the process continues to step 290, described below. If Max is less than or equal to the initial maximum, then in step 286 the process checks whether the Filtered Raw Value is greater than or equal to a point one-half the distance of the initial range below the initial minimum (the point Min2 in FIG. 8a), i.e., whether the raw value is still within a range that is twice the original initial range centered about the startup origin (or a distance equal to the initial range below the origin). If the Filtered Raw Value is less than the point Min2, then step 290 is performed, described below. If the Filtered Raw Value is greater than or equal to the point Min2, then step 288 is performed, in which Max is set equal to the Filtered Raw Value plus the initial range, i.e., the new Min plus the initial range. In step 290, Min is set equal to the Filtered Raw Value, and the process is then complete at 292.

Figure 8B:
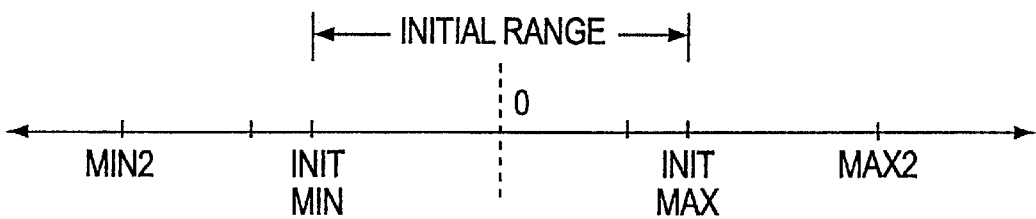

Thus, step 288 causes Max to "follow" the new Min set in step 290 such that the initial range distance is constant between Max and Min. This is performed each time a new Min value is to be set until one of the three checks 282, 284, or 286 fails, at which point Max is no longer moved toward Min and can only be increased to greater limits. At that point, only Min is moved to lesser values in step 290. The three checks fail when Max is detected within the manipulandum range and thus can be established within the range; Max only follows Min when Max has not yet been detected and thus it is not yet known whether Max is within the physical range of the device. For example, FIG. 8b shows the range of motion of FIG. 8a, where the current Max and Min points are also indicated. As shown by arrows 293, the Max point will follow the Min point as the Min point is set to lower values. Step 284 prevents Max from following Min once Max has been moved to a new limit above the initial maximum—for this to occur, Max was earlier detected within the physical range of the device in process 222 of FIG. 9 and need not be moved in conjunction with Min any longer. Step 286 prevents Max from following Min once Max has been moved to the origin of the manipulandum at startup. This is because the origin is known to be within the physical range of the manipulandum and thus there is no need to move Max further toward Min.

Figure 9:
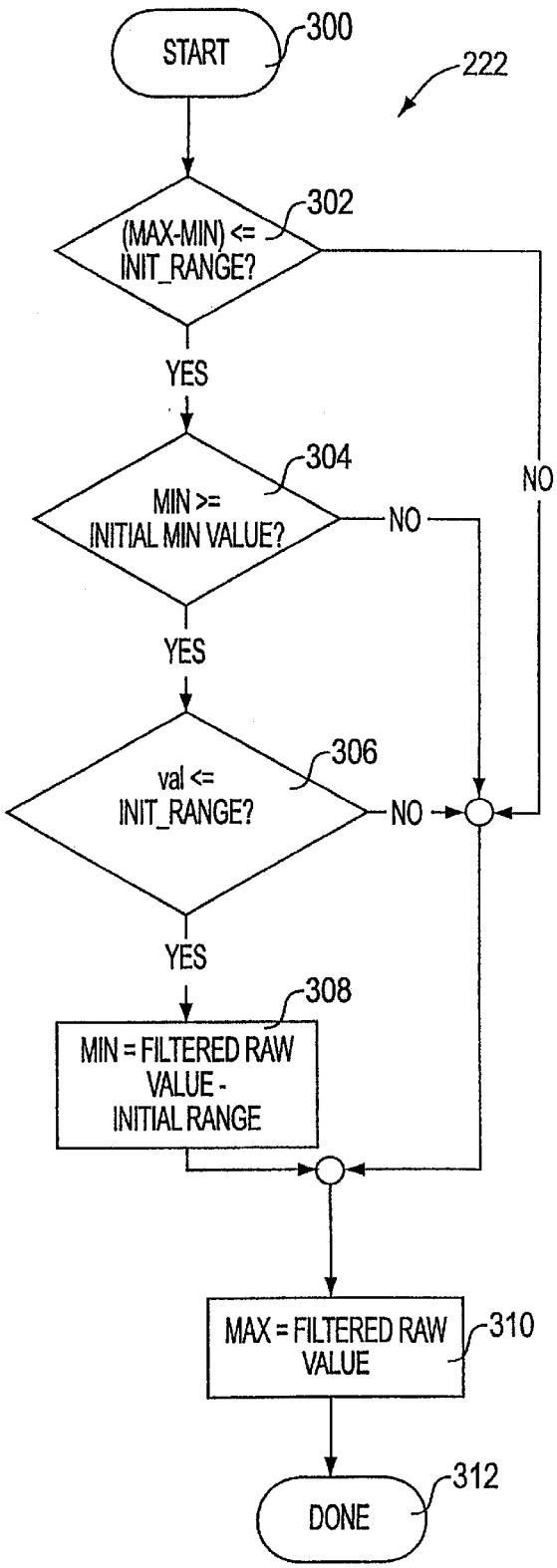
FIG. 9 is a flow diagram illustrating a step of FIG. 6 for setting a maximum of the dynamic range of the device.

FIG. 9 is a flow diagram illustrating step 220 of FIG. 6, in which a reset maximum process is performed to set a new maximum limit for the range of the manipulandum and to adjust the current minimum limit, if necessary. As in FIG. 8, this process is used for force feedback devices 12 having relative sensors. The process of FIG. 8 provides a default initial range to the manipulandum upon startup and may adjust this default range as the manipulandum moves through its workspace. The steps of FIG. 9 are analogous to those in FIG. 8, except that the Max value is adjusted (with the Min value following Max, if appropriate) rather than the Min value being adjusted.

The process 222 begins at 300, and in step 302, the process checks whether the size of the current range (Max–Min) is less than or equal to the size of the initial range. If the current range is greater than the initial range, then the current range has already been increased by a previous iteration of this process or process 218, and step 310 is performed, described below. If the current range is less than or equal to the initial range, then the process continues to step 304, in which the process checks whether Min is greater than or equal to the initial minimum value set in the initialization step 204. If Min is less than the initial maximum value, then the Min value has already been decreased by a previous iteration of the process 218, and the process continues to step 310, described below. If Min is greater than or equal to the initial minimum, then in step 306 the process checks whether the Filtered Raw Value is less than or equal to a point one-half the distance of the initial range above the initial maximum (the point Max2 in FIG. 8a), i.e., whether the raw value is still within a range that is twice the original initial range centered about the startup origin. If the Filtered Raw Value is greater than the point Max2, then step 310 is performed. If the Filtered Raw Value is less than or equal to the point Max2, then step 308 is performed, in which Min is set equal to the Filtered Raw Value minus the initial range. In step 310, Max is set equal to the Filtered Raw Value, and the process is then complete at 312.

Thus, step 308 causes Min to "follow" the new Max set in step 310 such that the initial range distance is constant between Max and Min. This is performed each time a new Max value is set until one of the three checks 282, 284, or 286 fails, at which point Min is no longer moved with Min and can only be increased to greater limits. At that point, only Max is moved to lesser values in step 290. Step 284 prevents Min from following Max once Min has been moved to a new limit past the initial maximum—Min thus has been detected in process 218 and need not be moved in conjunction with Max any longer. Step 286 prevents Min from following Max once Min has been moved to the origin of the manipulandum at startup.

Figure 10A:
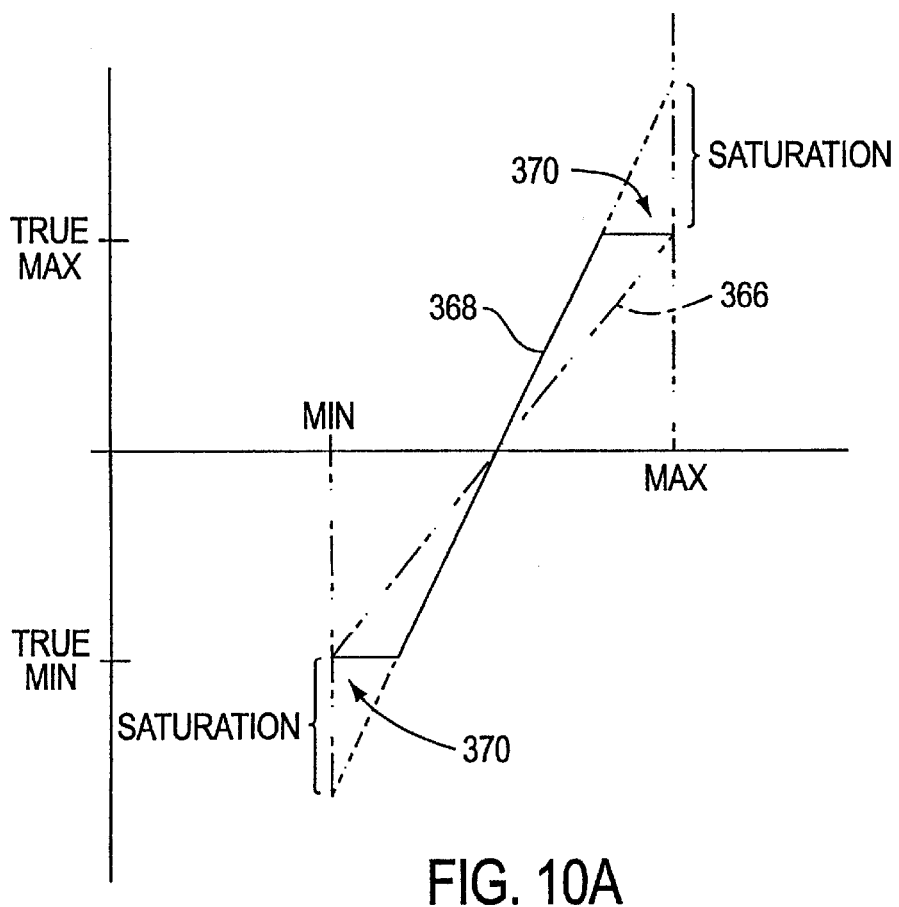
FIG. 10a is a graph of a normalization curve suitable for use with the process of FIG. 10.
Figure 10:
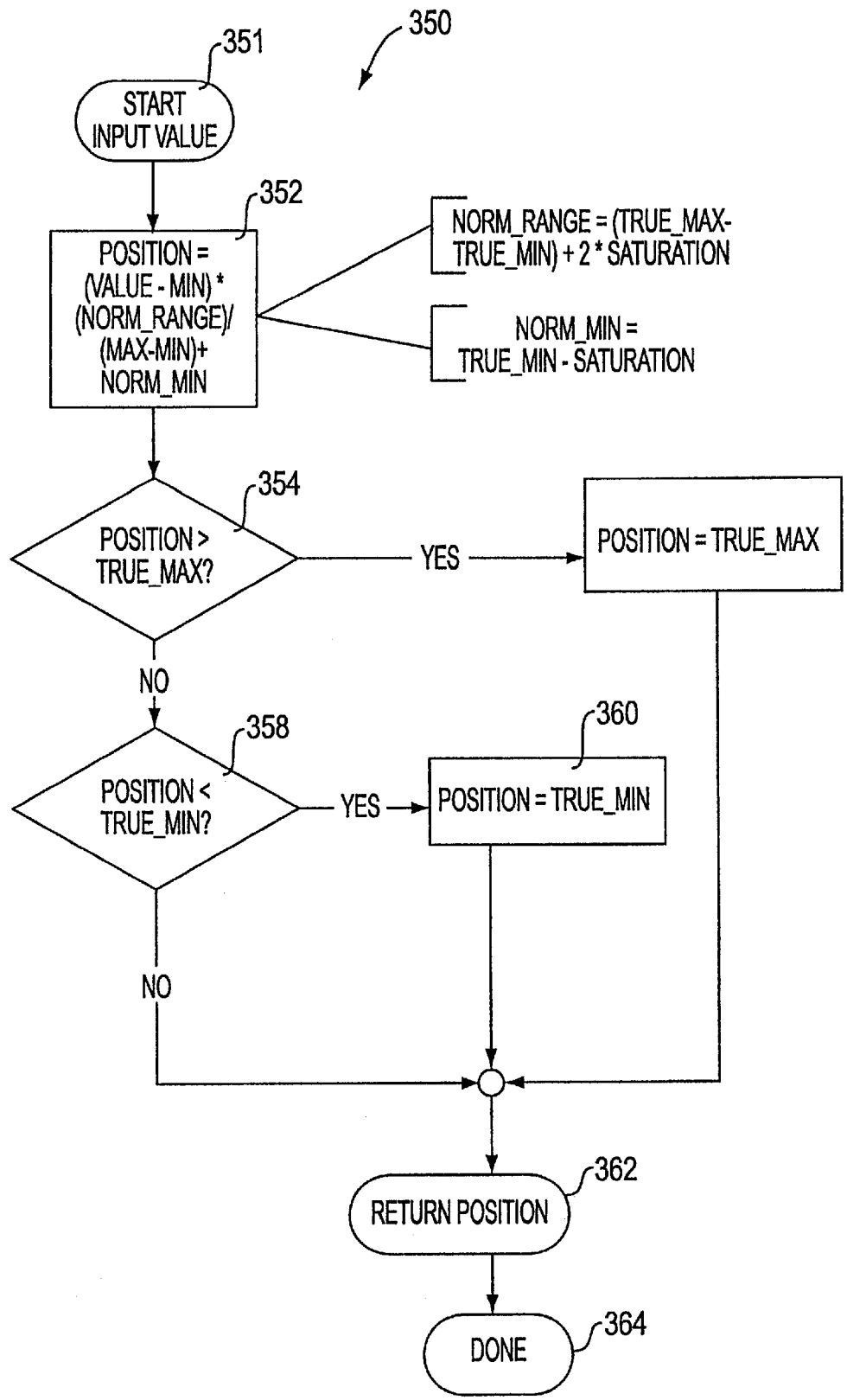
FIG. 10 is a flow diagram illustrating a step of FIG. 6 for normalizing a sensor value to a desired range.

FIG. 10 is a flow diagram illustrating the a process 350 called by the calculate normalized position steps 224 and 230 of FIG. 6. The normalized position process of the present invention includes providing "saturation zones" at the limits to the manipulandum range. These zones are intended to provide a constant position at the ends of manipulandum travel so that any deviations in the sensor readings are normalized. These deviations may be due to compliance in the transmission system or imperfections in sensors which may cause different readings from the sensor when the device is returned to the same position. More importantly, the deviations can be due to compliance in the hard stops of the device when the manipulandum impacts the hard stop at a high velocity, where the manipulandum cannot be easily moved to that same limit under slower velocities or other conditions. The normalization prevents any sensor data from being outside the normal physical range of the manipulandum so that the manipulandum can easily reach all positions within the sensed range regardless of velocity or other conditions. In contrast, the filtering process 214 described above typically only filters positions past desired limits occurring due to compliance in the transmission and inertia of the actuators, not due to compliance of the hard stops. Thus, there is value in implementing both the filtering process 214 of FIG. 7 as well as process 350 in a single force feedback device. In other embodiments of force feedback devices, process 350 can be implemented without the filtering process 214 while in other embodiments the filtering process 214 can be used without the normalized saturation zones.

The process begins at 351. In step 352, a normalizing equation is used to change a raw sensor value to a value within a range suitable for reporting to the host computer and/or for use by the device. A Position value is set equal to the value resulting from the relation (Value−Min) *(Norm_Range)/(Max−Min)+Norm_Min. When step 224 calls process 350, then Position is equal to the Normalized report Position and Value is equal to ReportRaw. Norm_Range is equal to (True Max_True_Min)+2*Saturation, and Norm_Min is equal to True_Min−Saturation.

FIG. 10a is a graph showing the relationship between the raw sensor range and the normalized sensor range, where Min and Max are the limits to the raw sensor range and True_Min and True_Max are the limits to the normalized sensor range. In an ideal normalization process where compliance does not exist, the curve 366 indicates a direct linear relationship between raw and normalized values. In the present invention, saturation zones are provided such that raw sensor values near the limits Min and Max are not normalized to corresponding values in the normalized domain past a saturation level. Curve 368 shows a normalization curve that can be used by the present invention, in which saturation zones 370 are provided at the extremes of the curve. Thus, any value that would be normalized to a value above True_Max or below True_Min is adjusted to the level of True_Max or True_Min (whichever is appropriate), so that True_Max and True_Min are "saturation levels." The Saturation value used in step 352 is the distance shown in FIG. 10a in the normalized scale at each extreme that extends above the saturation level. For example, in an embodiment using potentiometers a value of 100 can be used for the Saturation value, where True_Max equals 2048, True_Min=2048, Max 150, and Min=900). It should be noted that other normalization curves can alternatively be used, such as non-linear curves (e.g., rounded, bent, or stepped functions).

The saturation zones 370 are implemented in steps 354 to 360 of process 350. Referring back to FIG. 10, in step 354, the process checks whether Position is greater than True_Max. If so, then in step 356, Position is set equal to True_Max. This implements the saturation zone at the upper end of the range of motion, where if the normalized position is greater than the saturation limit True_Max, the position is set equal to True_Max. In step 362, the Position value is then returned to the calling step (step 224 or step 230 of FIG. 6), and the process is complete at 364. If the position is less than or equal to True_Max in step 354, then in step 358 the process checks if Position is less than True_Min. If so, then in step 360, Position is set equal to True_Min. This implements the saturation zone at the lower end of the range of motion. In step 362 the Position value is returned to the calling step and the process is complete at 362. If Position is greater than or equal to True_Min in step 358, then the Position determined in step 352 is between the saturation zones and in step 362 this value is returned to the calling step. The process is then complete at 364.

When called by step 224, the normalization process 350 normalizes the Report Raw value that has been compensated for compliance but which has not been filtered. When called by step 230, the normalization process normalizes the raw sensor value that has not been compensated, so that the device firmware may use a precise normalized value in local force determination.

While this invention has been described in terms of several preferred embodiments, it is contemplated that alterations, modifications and permutations thereof will become apparent to those skilled in the art upon a reading of the specification and study of the drawings. For example, the manipulandum, linkage, sensors and actuators used can be a variety of types. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for compensating for sensing inaccuracies contributed to by compliance in the mechanical systems of a force feedback device, the force feedback device being coupled to a host computer and including at least one actuator for outputting forces felt by said user, the method comprising:

reading a raw sensor value representing a position of a manipulandum of said force feedback device in a range of motion of said manipulandum, said manipulandum being physically contacted and manipulated by a user;

adjusting said raw sensor value based on a compliance of said force feedback device between a sensor and said manipulandum, said adjustment compensating for said compliance to provide a more accurate position of said manipulandum; and using said adjusted sensor value to represent said position of said manipulandum.

2. A method as recited in claim 1 wherein said adjusting of said raw sensor value includes adjusting said raw sensor value by a value determined based on a compliance constant and a current output force, wherein said compliance constant is previously determined.

3. A method as recited in claim 1 further comprising using said raw sensor value for determining closed-loop position-dependent forces by said force feedback device, and wherein said adjusted sensor value is reported to said host computer to update an application program implemented by said host computer.

4. A method as recited in claim 3 wherein said position-dependent forces are determined by a microprocessor local to said interface device and separate from said host computer.

5. A method as recited in claim 1 wherein said sensor value is obtained from a sensor coupled to said actuator of said force feedback device.

6. A method as recited in claim 1 wherein said force feedback device includes a belt drive for transmitting forces from said actuator to said manipulandum.

7. A method as recited in claim 1 wherein a microprocessor separate from said host computer and local to said force feedback device performs said adjusting.

8. A method as recited in claim 7 wherein said adjusted sensor value is reported to said host computer as said position of said manipulandum, wherein said host computer uses said adjusted sensor value when updating an application program implemented by said host computer.

9. A method as recited in claim 1 further comprising filtering said raw value for overshoot sensor values occurring at limits to said range of motion of said manipulandum.

10. A method as recited in claim 1 further comprising dynamically calibrating said range of motion of said manipulandum by adjusting minimum and maximum values of said range of motion based on the extent of motion of said manipulandum up to a current point in time.

11. A method as recited in claim 1 wherein said manipulandum is a joystick and wherein said joystick can be moved in two degrees of freedom, each of said degrees of freedom providing a different raw sensor value to be adjusted.

12. A method as recited in claim 1 further comprising normalizing said raw sensor value to a normalized range of motion, said normalizing including providing a saturation zone at ends of said normalized range of motion that adjusts sensor values over a saturation limit provided at said ends of said normalized range of motion to a saturation level, wherein said normalized sensor value is provided to said host computer.

13. A force feedback device coupled to a host computer, the force feedback device comprising:
   a manipulandum physically contacted and manipulable by a user;
   a linkage mechanism providing a degree of freedom to said manipulandum;
   at least one actuator coupled to said linkage mechanism, said actuator operative to output a force on said manipulandum in said degree of freedom;
   at least one sensor operative to sense a position of said manipulandum in said degree of freedom and to output a raw sensor value representing said position; and
   a local microprocessor, separate from and communicating with said host computer, said local microprocessor receiving said raw sensor value from said sensor and adjusting said raw sensor value based on a compliance between said sensor and said manipulandum in said force feedback device, said adjustment compensating for said compliance to provide a more accurate position of said manipulandum, and wherein said local microprocessor outputs said adjusted sensor value to said host computer as said position of said manipulandum.

14. A force feedback device as recited in claim 13 wherein said a linkage mechanism providing said manipulandum with first and second rotary degrees of freedom, said linkage mechanism and includes a chain of four rotatably-coupled members coupled to ground at each end of said chain.

15. A force feedback device as recited in claim 13 further comprising a belt drive transmission coupled between said actuator and said linkage mechanism, said belt drive transmission including a flat belt.

16. A force feedback device as recited in claim 15 wherein said manipulandum includes a joystick.

17. A force feedback device as recited in claim 15 wherein said at least one sensor is a relative digital encoder.

18. A force feedback device as recited in claim 13 wherein said at least one sensor is coupled to said at least one actuator of said force feedback device such that said sensor detects rotation of a shaft of said actuator.

19. A force feedback device as recited in claim 18 wherein said microprocessor dynamically calibrates said range of motion of said manipulandum by adjusting minimum and maximum values of said range of motion based on the extent of motion of said manipulandum up to a current point in time.

20. A force feedback device as recited in claim 13 wherein said local microprocessor uses said raw sensor value to determine closed-loop forces that are dependent on a position of said user object.

21. A method for dynamically calibrating a sensed range of motion of a manipulandum of a force feedback device, said force feedback device being coupled to a host computer and including an actuator and at least one relative sensor, the method comprising:
   a) providing a predetermined initial range of movement for said manipulandum when said force feedback device is initially powered, said initial range including two boundary values, said boundary values including a maximum value and a minimum value;
   b) receiving a sensor value representing a position of said manipulandum of said force feedback device in said range of movement as said manipulandum is moved;
   c) setting said maximum value or said minimum value to said received sensor value if said received sensor value is outside said initial range; and
   d) adjusting said other of said boundary values not set in step c) to maintain said initial range between said maximum value and said minimum value unless said other of said boundary values has been previously detected to be outside said initial range.

22. A method as recited in claim 21 wherein said initial range is greater than zero and is less than an entire physical range of motion of said manipulandum.

23. A method as recited in claim 22 wherein said initial range is about one-half an approximate full range of said sensor.

24. A method as recited in claim 21 wherein said manipulandum is considered to be positioned at about a center of said initial range of movement when said force feedback device is initially powered.

25. A method as recited in claim 21 wherein said manipulandum is a joystick handle.

26. A method for providing accurate sensing of position of a manipulandum in a force feedback device that includes compliance between said manipulandum and a position sensor of said force feedback device, the force feedback device including at least one actuator for outputting forces and being coupled to a host computer, the method comprising:
   reading a raw sensor value representing a position of a manipulandum of said force feedback device in a range of motion of said manipulandum, said manipulandum being phyisically contacted and manipulable by a user;
   filtering said raw sensor value for overshoot sensor values occurring at limits to said range of motion of said manipulandum; and
   dynamically calibrating said range of motion of said manipulandum by adjusting minimum and maximum values of said range of motion based on the extent of motion of said manipulandum up to a current point in time, wherein said dynamic calibration uses said filtered sensor values.

27. A method as recited in claim 26 further comprising using said unfiltered raw sensor values for determining a position of said manipulandum in said range of motion.

28. A method as recited in claim 26 wherein said filtering includes using a low pass filter on said raw sensor data.

29. A method as recited in claim 26 wherein said dynamically calibrating includes assigning an initial range with initial maximum and initial minimum values to said manipulandum.

30. A method as recited in claim 29 wherein said minimum and maximum values are adjusted to keep said initial range between said minimum and maximum values until both said minimum and maximum values are detected outside said initial range.

31. A method as recited in claim 29 wherein if said filtered sensor value is below said minimum value, further comprising:
   i) setting said minimum value to said filtered sensor value, and
   ii) adjusting said maximum value to maintain a constant range from said minimum value, unless said maximum value has previously been detected outside said initial range.

32. A method as recited in clam 31 wherein if said filtered sensor value is above said maximum value, further comprising:
   i) setting a maximum value to said filtered sensor value; and
   ii) adjusting said minimum value to maintain a constant range from said maximum value, unless said minimum value has previously been detected outside said initial range.

33. A method as recited in claim 26 further comprising adjusting said raw sensor value based on a compliance of said force feedback device, said adjustment compensating for said compliance to provide a more accurate position of said manipulandum and reporting said adjusted sensor value as said position of said manipulandum to said host computer.

34. A method as recited in claim 26 further comprising normalizing said raw sensor value to a normalized range, wherein said normalized value is reported to said host computer.

35. A method as recited in claim 34 wherein said normalizing includes providing a saturation zone at each limit of said normalized range, said saturation zone causing said sensor values over a saturation level provided at said ends of said normalized range of motion to be adjusted to said saturation level.

36. A method for compensating for sensing inaccuracies contributed to by compliance in the mechanical systems of a force feedback device, the force feedback device including at least one actuator for outputting forces and being coupled to a host computer, the method comprising:
   reading a raw sensor value representing a position of a manipulandum of said force feedback device in a range of motion of said manipulandum, said manipulandum being physically contacted and manipulable by a user;
   normalizing said raw sensor value to a normalized range of motion, said normalizing including providing a saturation zone at each end of said normalized range of motion that adjusts sensor values over a saturation level provided at said ends of said normalized range of motion to said saturation level; and
   reporting said normalized sensor value to said host computer, wherein said host computer updates an application program using said normalized sensor value.

37. A method as recited in claim 36 wherein said normalizing is provided according to a normalizing function, said normalizing function being a linear function having said saturation levels at said ends of said linear function, wherein said normalizing function has a greater slope between said ends of said range of motion than a normalizing function without said saturation zones.

38. A method as recited in claim 36 further comprising adjusting said raw sensor value based on a compliance of said force feedback device, said adjustment compensating for said compliance to provide a more accurate position of said manipulandum.

39. A method as recited in claim 38 wherein said adjusted sensor value is normalized to said normalized range of motion and is reported to said host computer.

40. A method as recited in claim 39 wherein said raw sensor value is normalized to said normalized range of motion and is used for local determination of forces by a local microprocessor separate from said host computer.

41. A method as recited in claim 40 wherein said local determination of forces includes determining a closed-loop condition force, said closed-loop condition force including one of a spring force, a damping force, and a texture force.

42. A method as recited in claim 36 further comprising dynamically calibrating said range of motion of said manipulandum by adjusting minimum and maximum values of said range of motion based on the extent of motion of said manipulandum up to a current point in time.

43. A method for dynamically calibrating a sensed range of motion of a manipulandum of a force feedback device during usage of the device, said force feedback device being coupled to a host computer and including an actuator and at least one sensor, the method comprising:
   providing a sensing range of motion for said manipulandum less than a full range of motion of said manipulandum, said sensing range having a maximum value and a minimum value;
   reading a sensor value using said at least one sensor, said sensor value representing a position of said manipulandum of said force feedback device as said manipulandum is moved;
   outputting a force on said manipulandum by said actuator approximately concurrently with said reading of said sensor value;
   setting said maximum value of said sensing range to said sensor value if said sensor value is greater than said maximum value, wherein said maximum value is not set if said force is being output in a direction towards a maximum physical limit past said maximum value; and
   setting said minimum value of said sensing range to said sensor value if said sensor value is less than said minimum value, wherein said minimum value is not set if said force is being output in a direction towards a minimum physical limit past said minimum value.

44. A method as recited in claim 43 further comprising repeating said reading, outputting and setting said values for a plurality of successive sensor values.

* * * * *